United States Patent
Miyagi et al.

(10) Patent No.: US 12,132,434 B2
(45) Date of Patent: Oct. 29, 2024

(54) DRIVER DEVICE

(71) Applicant: ROHM CO., LTD., Kyoto (JP)

(72) Inventors: Ryota Miyagi, Kyoto (JP); Hiroki Hashimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 210 days.

(21) Appl. No.: 17/913,371

(22) PCT Filed: Mar. 18, 2021

(86) PCT No.: PCT/JP2021/011016
§ 371 (c)(1),
(2) Date: Sep. 21, 2022

(87) PCT Pub. No.: WO2021/193335
PCT Pub. Date: Sep. 30, 2021

(65) Prior Publication Data
US 2023/0129142 A1 Apr. 27, 2023

(30) Foreign Application Priority Data
Mar. 27, 2020 (JP) .................................. 2020-058197

(51) Int. Cl.
*H02P 8/12* (2006.01)

(52) U.S. Cl.
CPC ...................................... *H02P 8/12* (2013.01)

(58) Field of Classification Search
CPC ............ H02P 8/12; G05B 24/00; G05B 19/40
USPC ........................................................ 318/696
See application file for complete search history.

(56) References Cited

U.S. PATENT DOCUMENTS

| 2009/0195202 A1* | 8/2009 | Takeuchi ................. H02P 6/16 318/400.37 |
| 2015/0311894 A1* | 10/2015 | McIntosh ......... G01R 19/16571 307/130 |
| 2016/0315571 A1* | 10/2016 | Hashimoto ............... H02P 8/18 |

FOREIGN PATENT DOCUMENTS

JP 2002017099 1/2002

OTHER PUBLICATIONS

International Search Report in International Appln. No. PCT/JP2021/011016, dated May 25, 2021, 5 pages (with English Translation).

* cited by examiner

*Primary Examiner* — Jorge L Carrasquillo
(74) *Attorney, Agent, or Firm* — Fish & Richardson P.C.

(57) ABSTRACT

A driver device includes a control circuit for controlling an output stage circuit for supplying an output current to a coil, and makes a movable part move with the magnetism generated by the supplied output current. The control circuit can perform holding control to hold the state of the movable part unchanged by suspending its movement. During the holding control by the control circuit, application of an external force tending to change the state of the movable part against the holding control is detected based on the state of supply of electric power to the coil by the output stage circuit, the output current, or the current flowing through the output stage circuit.

16 Claims, 8 Drawing Sheets

DRIVER DEVICE

TECHNICAL FIELD

The present disclosure relates to driver devices.

BACKGROUND ART

Stepping motors have many uses as in sheet feeders in copiers and printers, image readers in scanners, and the like. A kind of driver device (motor driver) for stepping motors includes, for each of the motor coils of different phases in a stepping motor, a full-bridge circuit (H-bridge circuit) for feeding it with an output current (coil current). As the polarity and magnitude of the output current for the motor coil of each phase are varied stepwise, a rotor is rotated stepwise.

A driver device for stepping motors generally employs PWM constant current control for the control of its output current. By PWM constant current control, the output current value for the motor coil of each phase is kept around a target current value for a desired period. Fixing the target current value results in holding the rotor angle unchanged.

CITATION LIST

Patent Literature

Patent Document 1: JP-A-2002-17099

Technical Problem

During holding control for holding the angle of a rotor unchanged, if an external force is applied to the rotor, the rotor may rotate against the holding control. For example, in a situation where a stepping motor is used for the driving of a sheet feeder as mentioned above, the force with which a user of a copier or printer pulls a sheet jammed in the sheet feeder is a kind of such external force. Rotation of a rotor as a result of application of an external force to it may cause a discrepancy between the electrical angle of the rotor as recognized by the system and the actual mechanical angle of the rotor, and this may destabilize the subsequent control. Application of an external force may also cause mechanical failure or deterioration.

A capability of detecting application of an external force as mentioned above would permit coping with it by an appropriate measure and contribute to enhanced convenience. Providing a separate encoder may enable detecting application of an external force, but leads to increased costs. While circumstances associated with driver devices have been discussed with focus on stepping motors, driver devices for controlling the driving of solenoid actuators and the like can be in similar circumstances.

An object of the present disclosure is to provide a driver device with a capability of detecting application of an external force to a movable part.

Solution to Problem

According to the present disclosure, a driver device that moves a movable part with the magnetism generated by supplying an output current to a coil includes: an output stage circuit configured to supply the output current to the coil by applying a voltage to the coil; and a control circuit configured to control the output stage circuit. The control circuit is configured to be able to perform holding control to hold the state of the movable part unchanged by suspending movement of the movable part through control of the output stage circuit. The driver device further includes: an external force detector configured to, during the holding control by the control circuit, detect application of an external force tending to change the state of the movable part against the holding control, based on the state of power supply to the coil by the output stage circuit, the output current, or the current flowing through the output stage circuit.

Advantageous Effects of Disclosure

According to the present disclosure, it is possible to provide a driver device with a capability of detecting application of an external force to a movable part

DESCRIPTION OF EMBODIMENTS

Hereinafter, examples of implementing the present disclosure will be described specifically with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs. For example, the external force detector described later and identified by the reference sign "160" (see FIG. 1) is sometimes referred to as the external force detector 160 and other times abbreviated to the detector 160, both referring to the same entity.

First, some of the terms used to describe embodiments of the present disclosure will be defined. "Ground" refers to a reference conductor at a reference potential of 0 V (zero volts), or to a potential of 0 V itself. A reference conductor is formed of an electrically conductive material such as metal. A potential of 0 V is occasionally referred to as a ground potential. In embodiments of the present disclosure, any voltage mentioned with no particular reference mentioned is a potential relative to the ground. "Level" denotes the level of a potential, and for any signal or voltage, "high level" has a higher potential than "low level". For any signal or voltage, its being at high level means its level being equal to high level, and its being at low level means its level being equal to low level. A level of a signal is occasionally referred to as a signal level, and a level of a voltage is occasionally referred to as a voltage level.

For any transistor configured as an FET (field-effect transistor), which can be a MOSFET, "on state" refers to a state where the drain-source channel of the transistor is conducting, and "off state" refers to a state where the drain-source channel of the transistor is not conducting (cut off). Similar definitions apply for any transistor that is not classified as an FET. Unless otherwise stated, any MOSFET can be understood to be an enhancement MOSFET. "MOSFET" is an abbreviation of "metal-oxide-semiconductor field-effect transistor". For any transistor, its being in the on or off state is occasionally expressed simply as its being on or off respectively.

Figure 1:
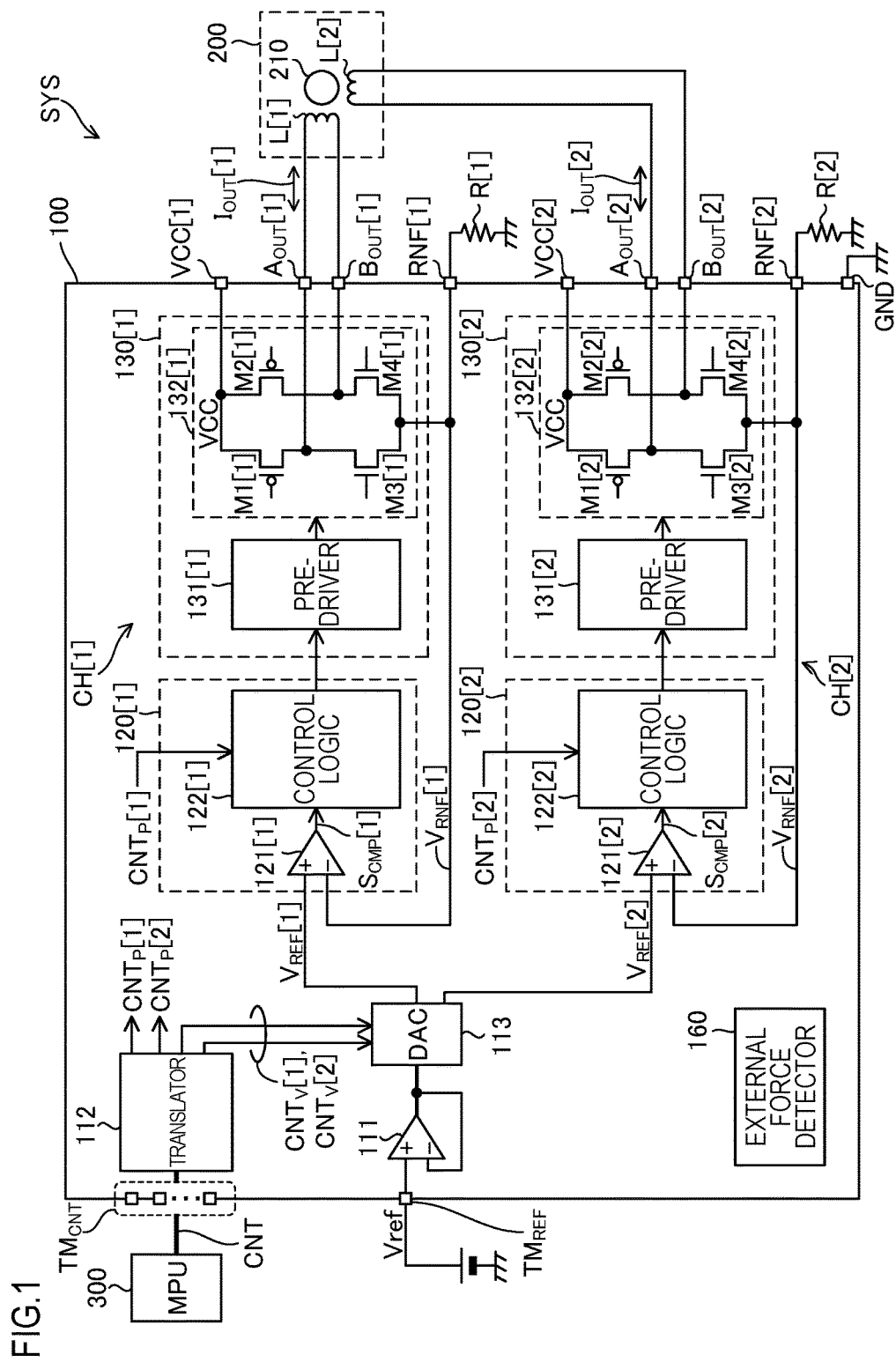
FIG. 1 is an overall configuration diagram of a motor driving system according to an embodiment of the present disclosure.

FIG. 1 is an overall configuration diagram of a motor driving system SYS according to an embodiment of the present disclosure. The motor driving system SYS includes a motor driver 100 as a driver device, a stepping motor 200, an MPU (microprocessor unit) 300, and current sensing resistors R[1] and R[2].

Figure 2:
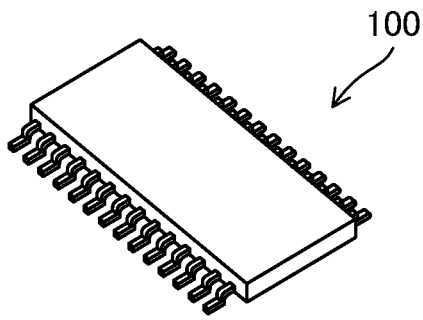
FIG. 2 is an exterior perspective view of a motor driver according to the embodiment of the present disclosure.

FIG. 2 is an exterior perspective view of the motor driver 100. The motor driver 100 is an electronic component (semiconductor device) formed by sealing a semiconductor integrated circuit in a package formed of resin. On the package of the motor driver 100, a plurality of external terminals are provided so as to be exposed. In the example of the configuration in FIG. 1, the plurality of external terminals provided in the motor driver 100 include power terminals VCC[1] and VCC[2], output terminals $A_{OUT}$[1], $B_{OUT}$[1], $A_{OUT}$[2], and $B_{OUT}$[2], resistor connection terminals RNF[1] and RNF[2], and a ground terminal GND, as well as a reference voltage input terminal $TM_{REF}$ and terminals serving as a control terminal group $TM_{CNT}$. Any other terminals may be included in the plurality of external terminals. Here, the number of external terminals on the motor driver 100 and the exterior view of the motor driver 100 shown in FIG. 2 are merely examples.

The stepping motor 200 includes motor coils (armature windings) for a plurality of phases and a rotor 210. The embodiment assumes that the stepping motor 200 is a two-phase stepping motor, and that, as the motor coils for two phases, motor coils L[1] and L[2] are provided in the stepping motor 200. Instead, as the stepping motor 200, a three-phase stepping motor with three motor coils or a five-phase stepping motor with five motor coils may also be used.

The MPU 300 controls the operation of the motor driver 100 by transmitting a control signal CNT to the motor driver 100. The motor driver 100 drives and controls the stepping motor 200 based on the control signal CNT. That is, the MPU 300 is an example of a processing device that controls the rotation of the rotor 210 by controlling the motor driver 100. The control signal CNT is fed to the control terminal group $TM_{CNT}$. The control signal CNT is composed of a plurality of control signals. No all of the plurality of control signals may be fed from the MPU 300. That is, for example, of the plurality of control signals composing the control signal CNT, one or more control signals may be fixed at low level or high level by being pulled down or up.

The motor driver 100 includes an input buffer 111, a translator 112, a DAC 113, which is a digital-to-analog converter, a plurality of channel circuits, and an external force detector 160. The motor driver 100 includes as many channel circuits as the number of motor coils provided in the stepping motor 200. That is, if the stepping motor 200 has N motor coils, so as to correspond to them, a total of N channel circuits are provided in the motor driver 100 (where N is any integer of two or more). Here, where it is assumed that the stepping motor 200 includes two motor coils L[1] and L[2], a channel circuit CH[1] that corresponds to the motor coil L[1] and a channel circuit CH[2] that corresponds to the motor coil L[2] are provided in the motor driver 100. Also, although not specifically illustrated, an oscillator, a regulator, and different protection circuits are also provided in the motor driver 100.

In the motor driver 100, each channel circuit includes a control circuit and an output stage circuit. The control circuit and the output stage circuit provided in the channel circuit CH[i] are referred to as the control circuit 120[i] and the output stage circuit 130[i] respectively. Here, i is any integer; the control circuit 120[i] refers to, if i=1, the control circuit 120[1] and, if i=2, the control circuit 120[2]. The same applies to the output stage circuit 130[i] etc. In each channel circuit, the control circuit 120[i] includes a comparator 121[i] and a control logic 122[i]. In each channel circuit, the output stage circuit 130[i] includes a pre-driver 131[i] and a full-bridge circuit 132[i] (an H-bridge circuit).

A motor coil and a current sensing resistor are connected to each channel circuit. The motor coil and the current sensing resistor that correspond to the channel circuit CH[i] are a motor coil L[i] and a current sensing resistor R[i]. Hereinafter, a circuit that includes a given channel circuit and a circuit including a motor coil and a current sensing resistor that correspond to the given channel circuit may be referred to as a channel. The channel composed of the channel circuit CH[1], the motor coil L[1], and the current sensing resistor R[1] is referred to as a first channel, and the channel composed of the channel circuit CH[2], the motor coil L[2], and the current sensing resistor R[2] is referred to as a second channel. The terminals $A_{OUT}$[i], $B_{OUT}$[i], RNF[i], and VCC[i] are the terminals that belong to the i-th channel (the terminals that correspond to the i-th channel).

A common supply voltage VCC is fed from a power supply circuit (not shown) provided outside the motor driver 100 to the power terminals VCC[1] and VCC[2]. The supply voltage VCC is a positive direct-current voltage (e.g., 24 V). The circuits in the motor driver 100 operate based on the supply voltage VCC. The ground terminal GND is connected to the ground.

The channel circuits CH[1] and CH[2] have the same circuit configuration, and the interconnection among the channel circuit, the motor coil, and the current sensing resistor is common to a plurality of channels. Thus, in the embodiment, the configuration of the i-th channel, voltages and currents in the i-th channel, etc. will be described using the symbol "i" representing any integer.

The output terminal $A_{OUT}[i]$ is connected to one terminal of the motor coil L[i], and the output terminal $B_{OUT}[i]$ is connected to the other terminal of the motor coil L[i]. A current passing between the output terminals $A_{OUT}[i]$ and $B_{OUT}[i]$ (thus, a current passing through the motor coil L[i]) is referred to as an output current $I_{OUT}[i]$. When the output current $I_{OUT}[i]$ passes from the output terminal $A_{OUT}[i]$ via the coil L[i] toward the output terminal $B_{OUT}[i]$, the polarity of the output current $I_{OUT}[i]$ is assumed to be positive and the polarity of the output current $I_{OUT}[i]$ opposite to it is assumed to be negative. As the polarities of the output currents $I_{OUT}[1]$ and $I_{OUT}[2]$ are changed or as the magnitudes and the polarities of the output currents $I_{OUT}[1]$ and $I_{OUT}[2]$ are changed, the rotor 210 rotates stepwise based on the magnetic force produced around the coils L[1] and L[2].

The current sensing resistor R[i] is provided outside the motor driver 100. The current sensing resistor R[i] is connected between the resistor connection terminal RNF[i] and the ground. The current sensing resistor R[i] senses the current passing through the motor coil L[i] and converts the sensed current into a voltage. The voltage at the resistor connection terminal RNF[i] is referred to as a detection voltage $V_{RNF}[i]$. The resistors R[1] and R[2] have the same (with some error permitted) resistance value (e.g., 0.1Ω to 0.3Ω). The current sensing resistor R[i] constitutes a current sensor. The current sensor senses the output current $I_{OUT}[i]$ to generate a current sense signal indicating the result of sensing of the output current $I_{OUT}[i]$. During a period in which the output current $I_{OUT}[i]$ passes through the resistor R[i], the detection voltage $V_{RNF}[i]$ has a voltage value proportional to the output current $I_{OUT}[i]$; thus, it functions as the current sense signal. The current sensing resistor R[i] may be incorporated in the motor driver 100. In that case, the current sensor is incorporated in the motor driver 100.

The input buffer 111, the translator 112, and the DAC 113 are the circuits shared between the first and second channels.

The input buffer 111 is a voltage follower configured with an operational amplifier and outputs a reference voltage Vref, which is fed to the reference voltage input terminal $TM_{REF}$, to the DAC 113 with a low impedance. The reference voltage Vref is a positive direct-current voltage. As will be clear from the description given later, the reference voltage Vref determines the maximum value of the magnitude of the output currents $I_{OUT}[1]$ and $I_{OUT}[2]$.

The translator 112 is connected to the control terminal group $TM_{CNT}$ to receive the control signal CNT. The control signal CNT determines the driving scheme and the excitation mode of the motor 200 and the rotation direction of the rotor 210, and the translator 112, based on the control signal CNT, generates and outputs internal control signals $CNT_V[1]$, $CNT_V[2]$, $CNT_P[1]$, and $CNT_P[2]$. In each channel, the magnitude of the output current $I_{OUT}[i]$ is controlled in accordance with the internal control signal $CNT_V[i]$, and the polarity (output logic) of the output current $I_{OUT}[i]$ is controlled in accordance with the internal control signal $CNT_P[i]$.

The DAC 113, based on the reference voltage Vref fed through the input buffer 111, generates reference voltages $V_{REF}[1]$ and $V_{REF}[2]$ that are respectively given by $V_{REF}[1]=k_{DAC}[1]\times$Vref and $V_{REF}[2]=k_{DAC}[2]\times$Vref Here, the coefficient $k_{DAC}[i]$ is determined by the internal control signal $CNT_V[i]$. For example, the internal control signal $CNT_V[i]$ is a 2-bit digital signal, and the coefficient $k_{DAC}[i]$ selectively takes one of the values 0, ⅓, ⅔, and 1 in accordance with the internal control signal $CNT_V[i]$. Here, the DAC 113 may be configured with a 2-bit digital-to-analog converter. This, however, is not meant to limit the number of bits in the DAC 113.

The control circuit 120[1] is fed with, as signals for the first channel, the reference voltage $V_{REF}[1]$, the detection voltage $V_{RNF}[1]$, and the internal control signal $CNT_P[1]$. The control circuit 120[2] is fed with, as signals for the second channel, the reference voltage $V_{REF}[2]$, a detection voltage $V_{RNF}[2]$, and the internal control signal $CNT_P[2]$.

The control circuit 120[i], based on the reference voltage $V_{REF}[i]$, the detection voltage $V_{RNF}[i]$, and the internal control signal $CNT_P[i]$, controls the output stage circuit 130[i] so that the output current $I_{OUT}[i]$ has a magnitude in accordance with the reference voltage $V_{REF}[i]$ and the output current $I_{OUT}[i]$ has a polarity in accordance with the internal control signal $CNT_P[i]$.

Specifically, in the control circuit 120[i], the non-inverting input terminal of the comparator 121[i] is fed with the reference voltage $V_{REF}[i]$, and the inverting input terminal of the comparator 121[i] is fed with the detection voltage $V_{RNF}[i]$. The comparator 121[i] compares the voltage $V_{REF}[i]$ with the voltage $V_{RNF}[i]$ and outputs a comparison result signal $S_{CMP}[i]$ indicating the result of comparison to the control logic 122[i]. The comparison result signal $S_{CMP}[i]$ is at high level when the reference voltage $V_{REF}[i]$ is higher than the detection voltage $V_{RNF}[i]$ and is at low level when the reference voltage $V_{REF}[i]$ is lower than the detection voltage $V_{RNF}[i]$. When $V_{REF}[i]=V_{RNF}[i]$, the comparison result signal $S_{CMP}[i]$ is at high or low level.

The control logic 122[i] generates a motor driving signal that specifies the on/off states of the output transistors in the full-bridge circuit 132[i] based on the comparison result signal $S_{CMP}[i]$ and the internal control signal $CNT_P[i]$, and outputs the generated motor driving signal to the pre-driver 131[i]. The pre-driver 131[i], in accordance with the motor driving signal, turns on and off individually the plurality of output transistors constituting the full-bridge circuit 132[i]. Here, the control logic 122[i], based on the comparison result signal $S_{CMP}[i]$ in the period during which the output current $I_{OUT}[i]$ passes from the terminal RNF[i] via the resistor R[i] to the ground, generates the motor driving signal such that the detection voltage $V_{RNF}[i]$ during this period is close (ideally, substantially equal) to the reference voltage $V_{REF}[i]$ and that the polarity of the output current $I_{OUT}[i]$ is the same as the polarity specified by the internal control signal $CNT_P[i]$.

In this way, the reference voltage $V_{REF}[i]$ and the internal control signal $CNT_P[i]$ constitute a current setting signal (in other words, a current command signal) that sets the target of the output current $I_{OUT}[i]$ to be fed to the motor coil L[i]. With the detection voltage $V_{RNF}[i]$ controlled so as to be close (ideally, substantially equal) to the reference voltage $V_{REF}[i]$, the output current $I_{OUT}[i]$ has a magnitude proportional to the reference voltage $V_{REF}[i]$ (however, for some reason, the output current $I_{OUT}[i]$ may have a magnitude contradicting the control; this will be described in detail later). That is, the target of the magnitude of the output current $I_{OUT}[i]$ is set by the reference voltage $V_{REF}[i]$. In addition, the target of the polarity of the output current $I_{OUT}[i]$ is set by the internal control signal $CNT_P[i]$.

The full-bridge circuit 132[1] is composed of the output transistors M1[1] and M2[1] configured as P-channel MOSFETs and the output transistors M3[1] and M4[1] configured as N-channel MOSFETs. The full-bridge circuit 132[2] is composed of the output transistors M1[2] and M2[2] configured as P-channel MOSFETs and the output transistors M3[2] and M4[2] configured as N-channel MOSFETs. A P-channel MOSFET is accompanied by a parasitic diode of which the forward direction points from the drain to the source, and an N-channel MOSFET is accompanied by a parasitic diode of which the forward direction points from the source to the drain. In FIG. 1, the parasitic diodes are omitted from illustration.

In the full-bridge circuit 132[i], the sources of the output transistors M1[i] and M2[i] are both connected to the power terminal VCC[i], and the supply voltage VCC is applied to the respective sources of the output transistors M1[i] and M2[i]. In the full-bridge circuit 132[i], the drains of the output transistors M1[i] and M3[i] are both connected to the output terminal $A_{OUT}[i]$, the drains of the output transistors M2[i] and M4[i] are both connected to the output terminal $B_{OUT}[i]$, and the sources of the output transistors M3[i] and M4[i] are both connected to the resistor connection terminal RNF[i]. The pre-driver 131[i], by controlling the gate potentials of the output transistors M1[i] to M4[i] in accordance with the motor driving signal from the control logic 122[i], turns on an off the output transistors M1[i] to M4[i] individually.

While the above description deals with an example where the full-bridge circuit 132[i] is configured with P-channel and N-channel MOSFETs, the output transistors constituting the full-bridge circuit 132[i] may all be N-channel MOSFETs. In that case, the circuit is modified as necessary. The full-bridge circuit 132[i] may be configured with bipolar transistors instead of MOSFETs.

The motor driver 100 can drive the stepping motor 200 in one of a plurality of excitation modes in accordance with the control signal CNT. The plurality of excitation modes include a full step excitation mode in which the rotor 210 is rotated stepwise every electrical angle of 90°, a half step excitation mode in which the rotor 210 is rotated stepwise every electrical angle of 45°, and a quarter step excitation mode in which the rotor 210 is rotated stepwise every electrical angle of 22.5°.

Figure 3:
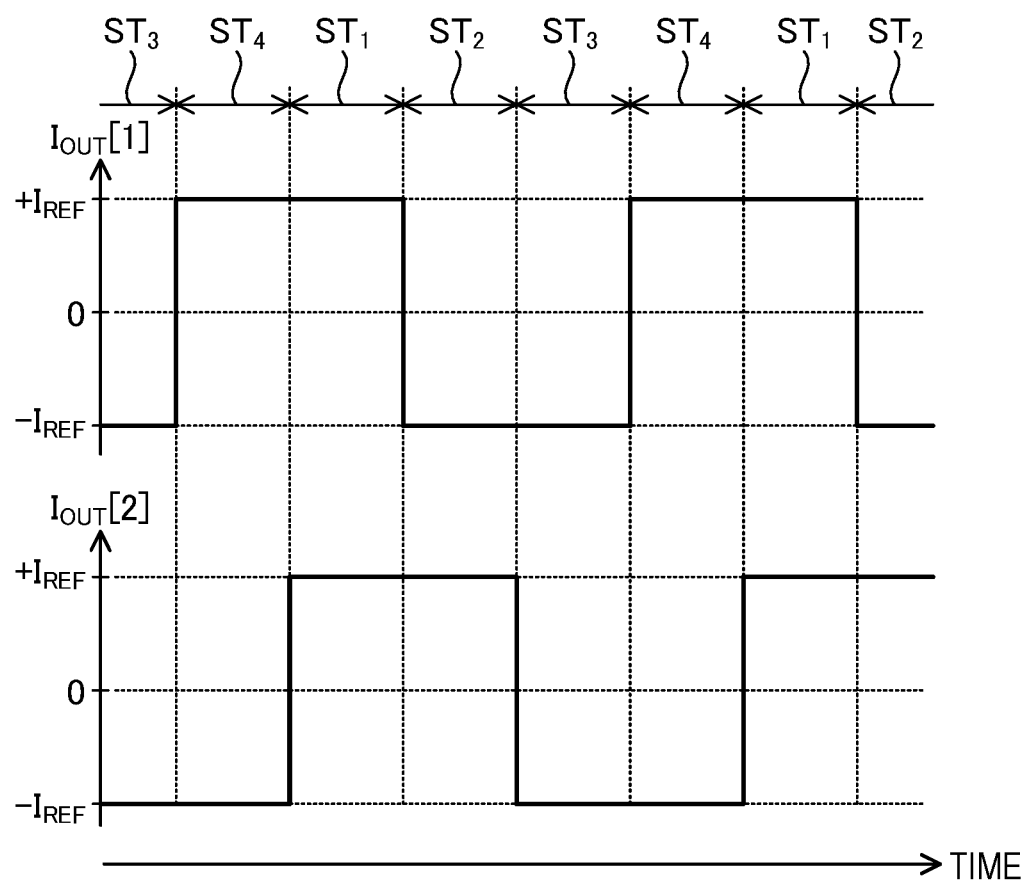
FIG. 3 is a diagram illustrating a full step excitation mode in connection with the embodiment of the present disclosure.

With reference to FIG. 3, the full step excitation mode will be described. In one example of implementation of the full step excitation mode, as shown in FIG. 3, states $ST_1$, $ST_2$, $ST_3$, and $ST_4$ occur in this order. Further, the sequence of states $ST_1$, $ST_2$, $ST_3$, and $ST_4$ occurs repeatedly. Thus, starting in state $ST_1$, states $ST_1$, $ST_2$, $ST_3$, and $ST_4$ occur in this order, and, after state $ST_4$, state $ST_1$, $ST_2$, $ST_3$, and $ST_4$ recur in this order.

The target value of the output current $I_{OUT}[i]$ is referred to as a target current value. The target current value for the output current $I_{OUT}[1]$ is represented by the symbol "$I_{TG}[1]$", and the target current value for the output current $I_{OUT}[2]$ is represented by the symbol "$I_{TG}[2]$". The magnitude (absolute value) of the target current value $I_{TG}[i]$ corresponds to the target of the magnitude of the output current $I_{OUT}[i]$ (hereinafter referred to as the target magnitude) and is determined by the reference voltage $V_{REF}[i]$. The polarity of the target current value $I_{TG}[i]$ corresponds to the target of the polarity of the output current $I_{OUT}[i]$ (hereinafter referred to as the target polarity) and is determined by the internal control signal $CNT_P[i]$. Like the output current $I_{OUT}[i]$, the target current value $I_{TG}[i]$ has a polarity. If the resistance value of the resistor R[i] is represented by the symbol "R[i]", then $|I_{TG}[i]|=V_{REF}[i]/R[i]$. In the full step excitation mode, the magnitudes (absolute values) of the target current values $I_{TG}[1]$ and $I_{TG}[2]$ are both equal to a predetermined current value $I_{REF}$ and are constant ($I_{REF}>0$). Thus, in the full step excitation mode, the reference voltages $V_{REF}[1]$ and $V_{REF}[2]$ are fixed at a constant voltage (e.g., fixed at a voltage equal to the reference voltage Vref). The current value $I_{REF}$ has a positive value proportional to the reference voltage Vref.

Specifically, in state $ST_1$, $(I_{TG}[1],I_{TG}[2])=(I_{REF},I_{REF})$, in state $ST_2$, $(I_{TG}[1],I_{TG}[2])=(-I_{REF},I_{REF})$, in state $ST_3$, $(I_{TG}[1],I_{TG}[2])=(-I_{REF},-I_{REF})$, and in state $ST_4$, $(I_{TG}[1],I_{TG}[2])=(I_{REF},-I_{REF})$.

Thus, the control circuits 120[1] and 120[2] control the output stage circuits 130[1] and 130[2] based on the reference voltages $V_{REF}[1]$ and $V_{REF}[2]$, the detection voltages $V_{RNF}[1]$ and $V_{RNF}[2]$, and the internal control signals $CNT_P[1]$ and $CNT_P[2]$ such that, in state $ST_1$, $(I_{OUT}[1],I_{OUT}[2])=(I_{REF},I_{REF})$, in state $ST_2$, $(I_{OUT}[1],I_{OUT}[2])=(-I_{REF},I_{REF})$, in state $ST_3$, $(I_{OUT}[1],I_{OUT}[2])=(-I_{REF},-I_{REF})$, and in state $ST_4$, $(I_{OUT}[1],I_{OUT}[2])=(I_{REF},-I_{REF})$.

Figure 4:
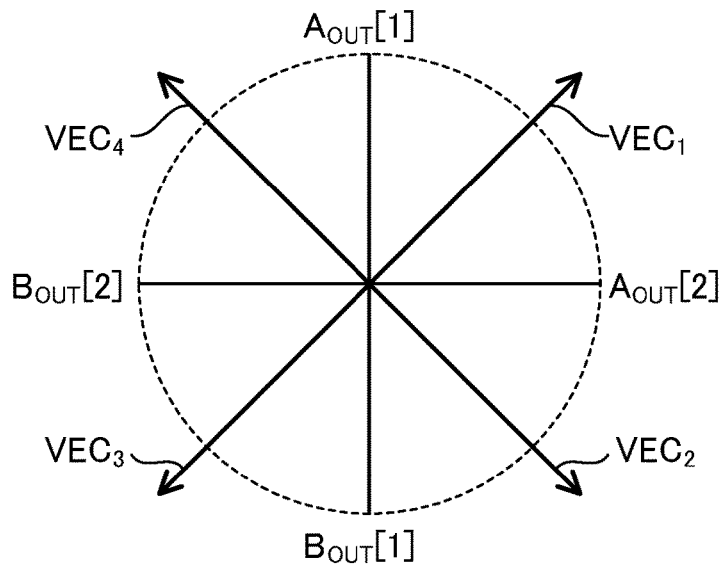
FIG. 4 is a diagram showing torque vectors in the full step excitation mode in connection with the embodiment of the present disclosure.

FIG. 4 is a diagram showing the torque vector of the stepping motor 200 in the full step excitation mode, expressed in degrees of electrical angle. Vectors $VEC_1$, $VEC_2$, $VEC_3$, and $VEC_4$ are the torque vectors in states $ST_1$, $ST_2$, $ST_3$, and $ST_4$ respectively. As the sequence of states $ST_1$, $ST_2$, $ST_3$, and $ST_4$ occurs repeatedly as shown in FIG. 3, the rotor 210 rotates stepwise every electrical angle of 90° in a first rotation direction; meanwhile the mechanical angle of the rotor 210 changes stepwise in the first rotation direction every angle corresponding to the amount of change in electrical angle. Reversely to what is shown in FIG. 3, it is possible to make states $ST_4$, $ST_3$, $ST_2$, and $ST_1$ occur in this order. In that case, the rotor 210 rotates stepwise in a second rotation direction opposite to the first rotation direction every electrical angle of 90°; meanwhile the mechanical angle of the rotor 210 changes stepwise in the second rotation direction every angle corresponding to the amount of change in electrical angle.

In the full step excitation mode, as described above, the target current value $I_{TG}[i]$ for each channel is switched between two current values "$I_{REF}$" and "$-I_{REF}$". Method for controlling the output currents $I_{OUT}[1]$ and $I_{OUT}[2]$ in the half step and the quarter step excitation modes are, like that in the full step excitation mode, well known; thus no detailed description will be given. In the half step excitation mode, the target current value $I_{TG}[i]$ for each channel is switched among a total of three current values "$I_{REF}$", "0", and "$-I_{REF}$", and, in the quarter step excitation mode, the target current value $I_{TG}[i]$ for each channel is switched among a total of seven current values "$I_{REF}$", "(⅔) $I_{REF}$", "(⅓) $I_{REF}$", "0", "$-(⅓) I_{REF}$", "$-(⅔) I_{REF}$", and "$-I_{REF}$".

The motor driver 100, through PWM constant current control, keeps the value of the output current $I_{OUT}[i]$ around the target current value $I_{TG}[i]$. PWM is an abbreviation of "pulse width modulation".

Figure 5:
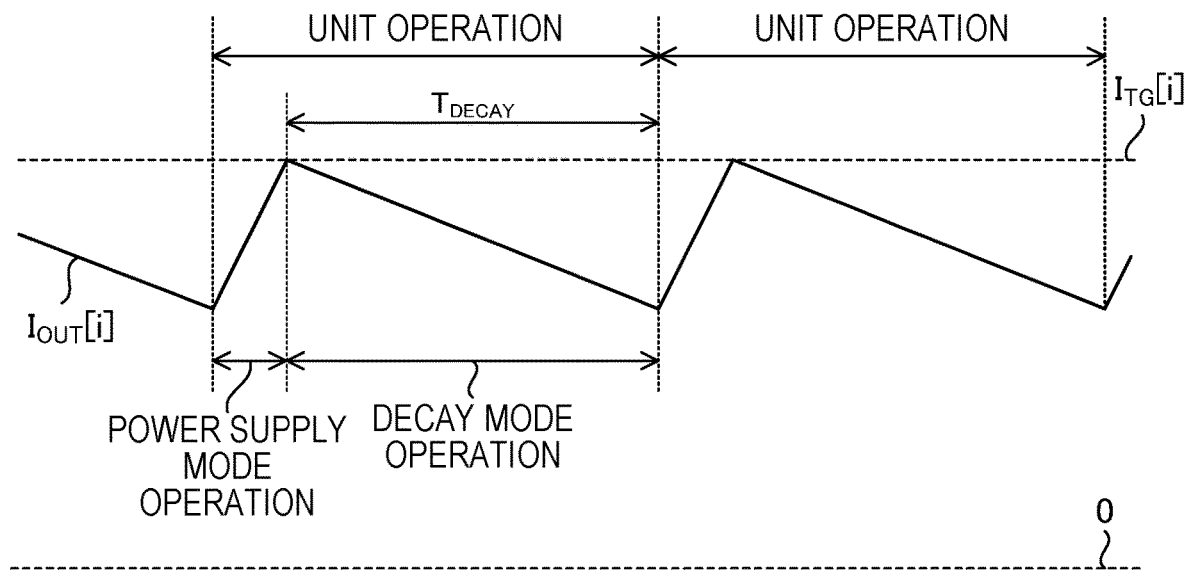
FIG. 5 is a diagram illustrating PWM constant current control according to the embodiment of the present disclosure.

With reference to FIG. 5, PWM constant current control will now be described. To give a specific description, it is assumed that $I_{TG}[i]>0$ and that the positive output current $I_{OUT}[i]$ is passing.

In PWM constant current control, the control circuit 120[i] refers to the detection voltage $V_{RNF}[i]$ observed when the output current $I_{OUT}[i]$ is passing across the resistor R[i]. If $V_{REF}[i]>V_{RNF}[i]$, the control circuit 120[i] sets the operation mode of the i-th channel to a power supply mode until the detection voltage $V_{RNF}[i]$ reaches the reference voltage $V_{REF}[i]$ (i.e., until the value of the output current $I_{OUT}[i]$ reaches the target current value $I_{TG}[i]$). When the detection voltage $V_{RNF}[i]$ reaches the reference voltage $V_{REF}[i]$ (i.e., when the value of the output current $I_{OUT}[i]$ reaches the target current value $I_{TG}[i]$), the control circuit 120[i] switches the operation mode of the i-th channel from the power supply mode to a decay mode. After the switch to the decay mode, when a prescribed decay time $T_{DECAY}$ has passed, the operation mode of the i-th channel is switched from the decay mode back to the power supply mode.

The control circuit 120[i], in the period during which the operation mode of the i-th channel is the power supply mode, brings the output stage circuit 130[i] into a power supply state to perform a power supply mode operation and, in the period during which the operation mode of the i-th channel is the decay mode, brings the output stage circuit 130[i] into a decay state to perform a decay mode operation. The power supply state and the power supply mode operation are a state and an operation for increasing the magnitude of the output current $I_{OUT}[i]$, and the decay state and the decay mode operation are a state and an operation for making decay the magnitude of the output current $I_{OUT}[i]$. A sequence of one power supply mode operation and one decay mode operation performed one after the other is referred to as a unit operation. In PWM constant current control, through repetition of the unit operation, the magnitude of the output current $I_{OUT}[i]$ is kept around the target current value $I_{TG}[i]$ while being equal to or smaller than the absolute value $|I_{TG}[i]|$ (i.e., equal to or smaller than the magnitude of the target current value $|I_{TG}[i]|$).

Figure 6:
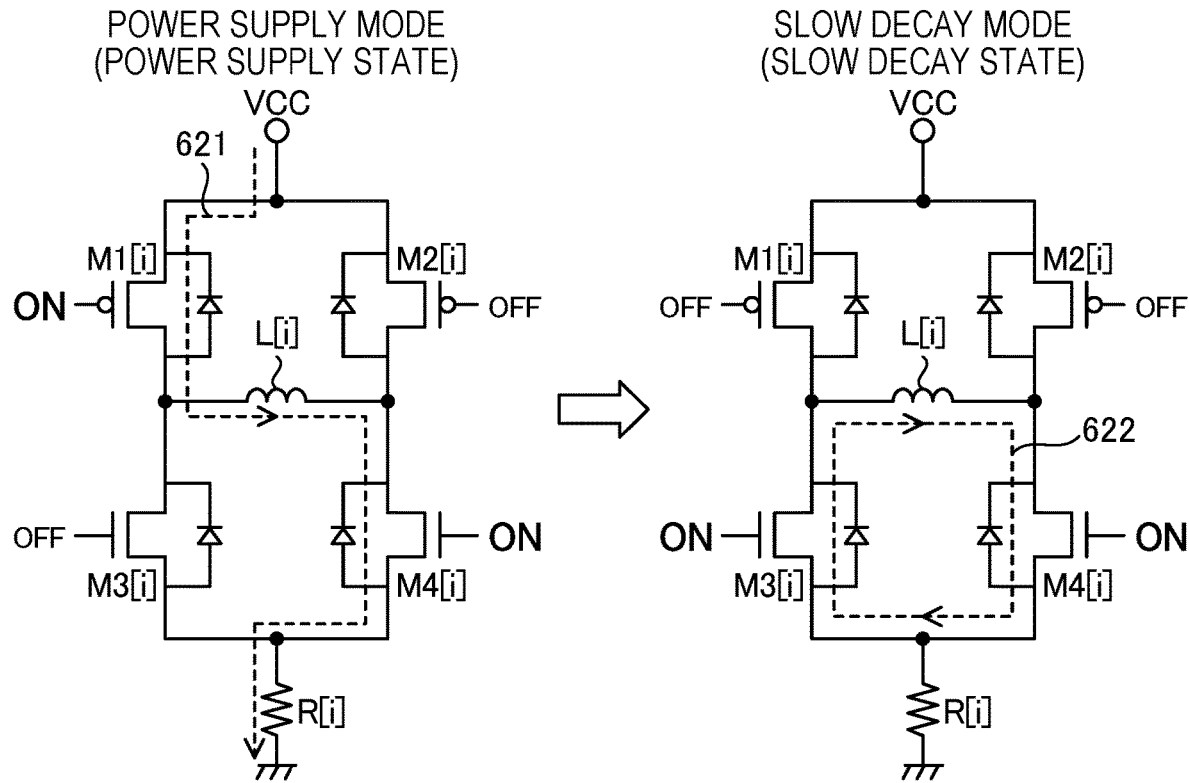
FIG. 6 shows a switch from a power supply mode to a slow power supply mode in connection with the embodiment of the present disclosure.
Figure 7:
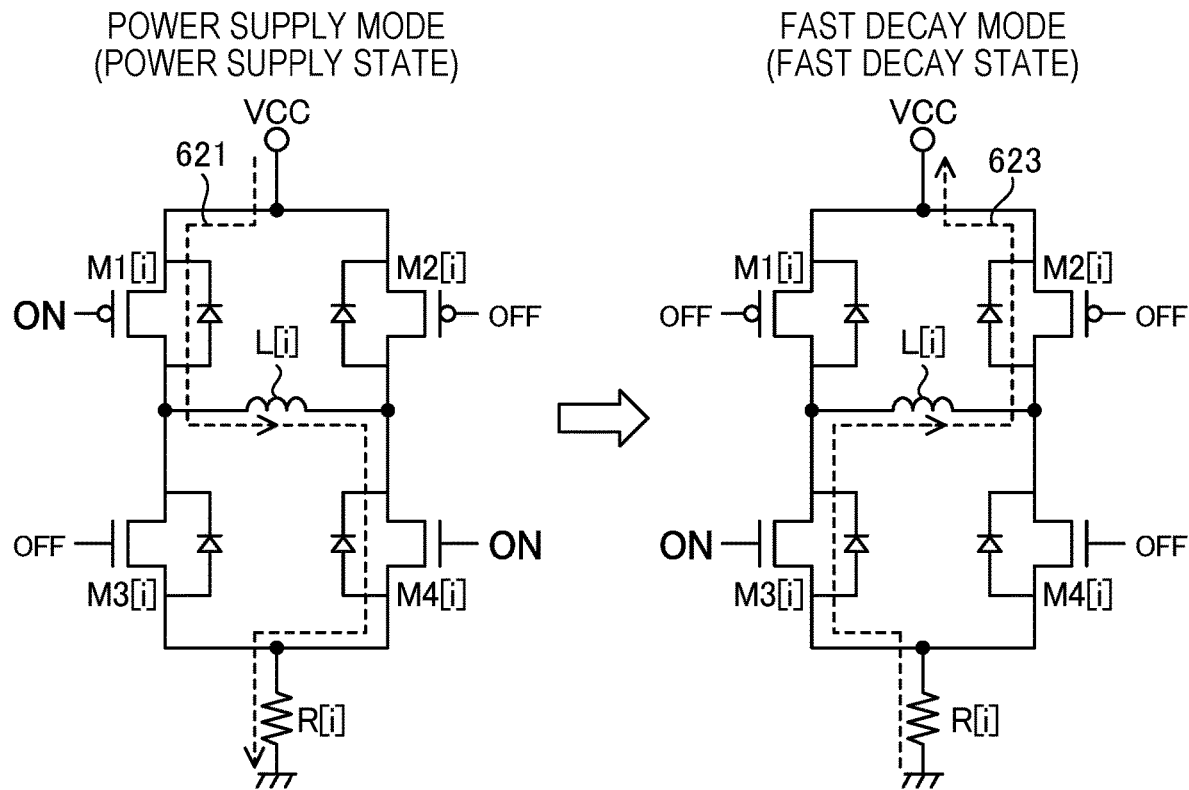
FIG. 7 shows a switch from the power supply mode to a fast power supply mode in connection with the embodiment of the present disclosure.

The decay mode has a slow decay mode and a fast decay mode. FIG. 6 shows a switch from the power supply mode to the slow decay mode. FIG. 7 shows a switch from the power supply mode to the fast decay mode. Note that, in FIGS. 6 and 7, it is assumed that $I_{TG}[i]>0$. With reference to FIGS. 6 and 7, the power supply mode, the slow decay mode, and the fast decay mode with the $I_{TG}[i]>0$ will be described.

In the i-th channel, in the power supply mode, the output stage circuit 130[i] is in the power supply state. When the output stage circuit 130[i] is in the power supply state, it means that the full-bridge circuit 132[i] is in the power supply state. An arrowed broken line 621 in FIGS. 6 and 7 indicates the flow of the output current $I_{OUT}[i]$ in the power supply state. When the output stage circuit 130[i] is in the power supply state, the output transistors M1[i] and M4[i] are on and in addition the output transistors M2[i] and M3[i] are off. Thus, in the power supply mode of the i-th channel, a positive output current $I_{OUT}[i]$ passes from the terminal fed with the supply voltage VCC via the output transistor M1[i], the motor coil L[i], the output transistor M4[i], and the resistor R[i] toward the ground, and the magnitude of the output current $I_{OUT}[i]$ increases with time. The operation achieved with the output stage circuit 130[i] in the power supply state corresponds to the power supply mode operation.

In the i-th channel, in the slow decay mode, the output stage circuit 130[i] is in a slow decay state, which is one kind of decay state. When the output stage circuit 130[i] is in the slow decay state, it means that the full-bridge circuit 132[i] is in the slow decay state. An arrowed broken line 622 in FIG. 6 indicates the flow of the output current $I_{OUT}[i]$ in the slow decay state. When the output stage circuit 130[i] is in the slow decay state, the output transistors M3[i] and M4[i] are on and in addition the output transistors M1[i] and M2[i] are off. Thus, in the slow decay mode of the i-th channel, a positive output current $I_{OUT}[i]$ passes through a path via the output transistor M3[i], the motor coil L[i], and the output transistor M4[i], and the magnitude of the output current $I_{OUT}[i]$ decreases with time. The operation achieved with the output stage circuit 130[i] in the slow decay state is one kind of decay mode operation. In the slow decay mode of the i-th channel, the output transistor M3[i] may be off.

In the i-th channel, in the fast decay mode, the output stage circuit 130[i] is in a fast decay state, which is another kind of decay state. When the output stage circuit 130[i] is in the fast decay state, it means that the full-bridge circuit 132[i] is in the fast decay state. An arrowed broken line 623 in FIG. 7 indicates the flow of the output current $I_{OUT}[i]$ in the fast decay state. When the output stage circuit 130[i] is in the fast decay state, the output transistor M3[i] is on and in addition the output transistors M1 [i], M2[i], and M4[i] are off. Thus, in the fast decay mode of the i-th channel, a positive output current $I_{OUT}[i]$ passes from the ground via the resistor R[i], the output transistor M3[i], the motor coil L[i], and the output transistor M2[i] (a parasitic diode in the output transistor M2[i]) toward the terminal fed with the supply voltage VCC, and the magnitude of the output current $I_{OUT}[i]$ decreases with time. The operation achieved with the output stage circuit 130[i] in the fast decay state is another kind of decay mode operation. Here, in the fast decay mode of the i-th channel, the output transistor M2[i] may be on, or the output transistor M3[i] may be off. In the fast decay mode of the i-th channel, the output transistors M1[i] to M4[i] may all be off. Although not specifically illustrated, on the occasion of a shift from the power supply state to the slow or fast decay state or a shift the other way around, a dead time is inserted as necessary to reliably prevent the series-connected output transistors from turning on simultaneously.

The slow and fast decay modes compare as follows: the decay rate of the output current $I_{OUT}[i]$ is lower in the slow decay mode than in the fast decay mode. As is well known, the slow and fast decay modes have their respective advantages and disadvantages. In the decay mode operation in each unit operation, a mixed decay mode operation may be performed where a period in which the output stage circuit 130[i] is in the slow decay state and a period in which the output stage circuit 130[i] is in the fast decay state are mixed. Based on a decay mode setting signal included in the control signal CNT, which operation to use as the decay mode operation is selected out of the slow decay mode operation with only the slow decay state, the fast decay mode operation with only the fast decay state, and the mixed decay mode operation. While the above description deals with the different mode operations with $I_{TG}[i]>0$, the same applies with $I_{TG}[i]<0$.

In any case, in the power supply mode operation in the i-th channel, the output stage circuit 130[i] is in the power supply state in which it feeds electric power to the motor coil L[i] to increase the magnitude of the output current $I_{OUT}[i]$, and, in the decay mode operation in the i-th channel, the output stage circuit 130[i] is in the decay state in which it suspends supplying electric power (suspends the supply of electric power intended to increase the magnitude of the output current $I_{OUT}[i]$) to make decay the magnitude of the output current $I_{OUT}[i]$.

In the stepping motor 200, control (hereinafter referred to as holding control) is possible whereby the rotation of the rotor 210 is suspended to hold the angle of the rotor 210 unchanged. The angle of the rotor 210 denotes the electrical or mechanical angle of the rotor 210 relative to a predetermined fixed axis. With the electrical angle of the rotor 210 held unchanged, naturally the mechanical angle of the rotor 210 is held unchanged. Holding control corresponds to performing PWM constant current control for each channel with the target current values $I_{TG}[1]$ and $I_{TG}[2]$ each held constant, and the agent of holding control is the control circuits 120[1] and 120[2]. Even with holding control in effect, if an external force equal to or greater than a predetermined magnitude is applied to the rotor 210, the rotor 210 rotates. In the embodiment, an external force is a force that makes the rotor 210 rotate (i.e., changes the electrical and mechanical angles of the 210) against holding control while it is in effect by the operation of the control circuits 120[1] and 120[2] and that is applied from outside the stepping motor 200 (from outside the motor driving system SYS). One example of an external force is, in a case where a stepping motor 200 is used for the driving of a sheet feeder in a copier or printer, the force with which a user of the copier or printer pulls a sheet jammed in the sheet feeder.

If the rotor 210 acted on by an external force rotates, a discrepancy may arise between the electrical angle of the rotor 210 as recognized by the motor driving system SYS and the actual mechanical angle of the rotor 210, destabilizing the subsequent control. An external force may also lead to mechanical failure or deterioration. A capability of detecting the acting of an external force as mentioned above would permit coping with it by an appropriate measure and contribute to enhanced convenience. With this in mind, the motor driver 100 is provided with an external force detector 160 for detecting application of the external force mentioned above.

Figure 8:
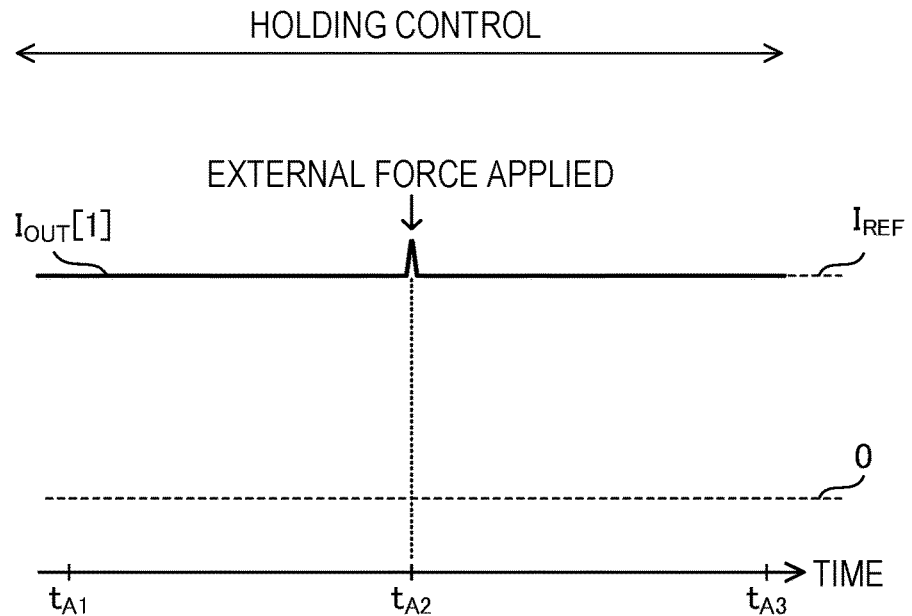
FIG. 8 is a diagram illustrating a current bump observed in the waveform of an output current to a motor coil due to application of an external force in connection with the embodiment of the present disclosure.

Referring to FIG. 8, the behavior of the output current in response to application of an external force will be described. FIG. 8 focuses on the first channel and shows the waveform of the output current $I_{OUT}[1]$. As time passes, time points $t_{41}$, $t_{42}$, and $t_{43}$ occur in this order. At least between time points $t_{41}$ and $t_{43}$, holding control is performed such that $I_{TG}[1]=I_{REF}$ and $I_{TG}[2]=I_{CONST}$. Here, $I_{CONST}$ represents a constant current value (e.g., $I_{REF}$ or ($-I_{REF}$)). That is, at least between time points $t_{41}$ and $t_{43}$, holding control is performed to keep the angle of the rotor 210 unchanged by holding the target current value $I_{TG}[1]$ at the count value $I_{REF}$ and the target current value $I_{TG}[2]$ at the current value $I_{CONST}$. In the example in FIG. 8, between time points $t_{41}$ and $t_{43}$, in principle no external force is being applied, and only in a minute external force application period centered around time point $t_{42}$ is an external force applied to the rotor 210 to cause it to rotate.

Through PWM constant current control for holding control, during the period in which no external force is being applied, the output current $I_{OUT}[1]$ is kept around the target current value $I_{TG}[1]$. By contrast, during the external force application period mentioned above, the rotation of the rotor 210 under the external force makes the stepping motor 200 function as an electric generator; thus the stepping motor 200 generates energy, which increases the output current $I_{OUT}[1]$. While FIG. 8 shows an example of a waveform where the output current $I_{OUT}[1]$ has one peak in response to the application of the external force, it may have a plurality of peaks depending on how the rotor 210 is rotating due to application of the external force.

Figure 9:
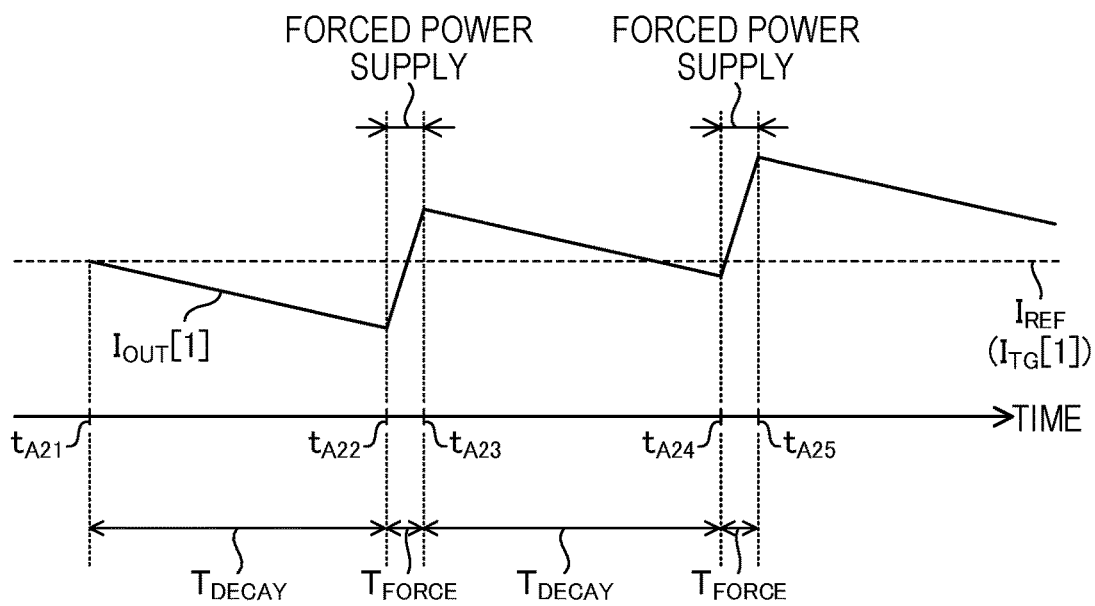
FIG. 9 is a diagram showing the output current rising above a target current value in connection with the embodiment of the present disclosure.

FIG. 9 shows the waveform of the output current $I_{OUT}[1]$ during part of the external force application period (the period corresponding to three unit operations from $t_{421}$). In general, when the output transistors constituting the full-bridge circuit switch states between on and off, spike noise occurs. To suppress the effect of the spike noise through PWM constant current control, in each channel, after a shift from the decay state to the power supply state, the output stage circuit is forcibly brought into the power supply state for a predetermined forced power supply time $T_{FORCE}$ (minimum on time). Forcibly bringing the output stage circuit into the power supply state is referred to as forced power supply.

The operation connected with forced power supply will be described with focus on the i-th channel. During forced power supply in the i-th channel, the output stage circuit 130[i] is brought into the power supply state regardless of the detection voltage $V_{RNF}[i]$ (i.e., regardless of the magnitude relationship between the reference voltage $V_{REF}[i]$ and the detection voltage $V_{RNF}[i]$) so that the power supply mode operation described above is performed. Then, in the i-th channel, after the power supply mode operation is started, when the forced power supply time $T_{FORCE}$ has passed, if the comparator 121[i] detects the magnitude of the output current $I_{OUT}[i]$ having become equal to or larger than the magnitude of the target current value $I_{TG}[i]$ (i.e., the comparison result signal $S_{CMP}[i]$ being at low level), a switch is made from the power supply mode to the decay mode, and the decay mode operation is performed for a predetermined decay time $T_{DECAY}$. After the decay mode operation is performed for the decay time $T_{DECAY}$, the power supply mode operation starts again, and the power supply mode operation is performed at least for the forced power supply time $T_{FORCE}$. In FIG. 9, forced power supply is performed between time points $t_{422}$ and $t_{423}$ and between time points $t_{424}$ and $t_{425}$. Inherently, the forced power supply time $T_{FORCE}$ is set to a time so minute that, during forced power supply, the magnitude of the output current $I_{OUT}[i]$ may not rise above the magnitude of the target current value $I_{TG}[i]$.

However, in FIG. 9 with focus on the first channel with $I_{TG}[1]=I_{REF}$, after time point $t_{422}$, under the application of the external force, the output current $I_{OUT}[1]$ is augmented to rise above the target current value $I_{TG}[1]$ (here, $I_{REF}$). While in the example in FIG. 9, in the decay mode after time point $t_{422}$, the output current $I_{OUT}[1]$ decreases, even in the decay mode the output current $I_{OUT}[1]$ may rise depending on how the rotor 210 is rotating under the external force. An event in which, as described above, the magnitude of the output current $I_{OUT}[1]$ exceeds the magnitude (here, $I_{REF}$) of the target current value $I_{TG}[1]$ will be referred to as a current bump. The current bump to which attention is paid in the embodiment results from an external force being applied while holding control is in effect. A current bump due to an external force can occur regardless of which decay mode is being used: the slow decay mode, the fast decay mode, or the mixed decay mode.

While the description thus far has focused on what occurs when the target current value $I_{TG}[1]$ is positive, a current bump can occur likewise when the target current value $I_{TG}[1]$ is negative. That is, a current bump is an event in which the magnitude of the output current $I_{OUT}[1]$ rises above the magnitude of the target current value $I_{TG}[1]$ (the target magnitude $|I_{REF}|$) against holding control. While the description has focused on the first channel, a current bump can occur in either of the first and second channels.

The external force detector 160 shown in FIG. 1 can detect, in the waveform of the output current $I_{OUT}[i]$, occurrence of a particular current waveform that meets a predetermined condition for discriminating a current bump. Meanwhile, during holding control, the external force detector 160 detects, as the particular current waveform, a waveform (corresponding to the waveform around time point $t_{A2}$ in FIG. 8) in which the magnitude of the output current $I_{OUT}[i]$ rises above the target magnitude (e.g., $I_{REF}$) against the holding control. Here, a particular current waveform is a current waveform resulting from a current bump based on an external force; on detecting occurrence of the particular current waveform, the external force detector 160 recognizes application of the external force. That is, the external force detector 160 can detect application of an external force by detecting occurrence of a particular current waveform. Detecting occurrence of a particular current waveform is equivalent to detecting application of an external force (in other words, recognizing application of an external force). To prevent a current waveform resulting from a slight bump from being detected as the particular current waveform, a condition for discriminating a current bump is set. In any of the practical examples described later, a current waveform that is recognized to be the particular current waveform (i.e., a current waveform that is recognized to indicate application of an external force) meets the condition for discriminating a current bump. When occurrence of the particular current waveform is detected in at least one of the waveforms of the output currents $I_{OUT}[1]$ and $I_{OUT}[2]$, the external force detector 160 recognizes application of an external force, and substitutes "1" in a flag FLG (not shown) it manages. The initial value of the flag FLG is "0" and is kept at "0" unless occurrence of the particular current waveform is recognized (i.e., unless application of an external force is recognized).

When "1" is substituted in the flag FLG, the external force detector 160 can transmit to the MPU 300 a predetermined detection signal indicating detection of application of an external force. When "1" is substituted in the flag FLG, the external force detector 160 may transmit the detection signal in response to receipt of a predetermined request signal from the MPU 300 or may, without requiring receipt of a request signal or the like, transmit the detection signal in response to substitution of "1" in the flag FLG. After transmission of the detection signal, "0" may be substituted in the flag FLG, or the value of the flag FLG may be latched at "1".

Owing to the external force detector 160, rotation of the rotor 210 due to an external force and unintended by the system can be recognized in the motor driver 100 and the motor driving system SYS, and can be coped with by an appropriate measure. For example, the user can be warned against applying an external force to a sheet feeder as mentioned above, or a predetermined error handling process can be performed. This helps stabilize the equipment that incorporates the motor driving system SYS.

For another example, on detection of an external force, at any time point thereafter, the control circuits 120[1] and 120[2] can be made to perform a predetermined initializing process. This ensures stable driving of the stepping motor 200 after the application of the external force. The initializing process is a process whereby the electrical angle of the rotor 210 is set to the predetermined initial angle, and may be the same as that performed when the motor driver 100 starts up.

Hereinafter, by way of a plurality of practical examples, specific examples of the operation of the motor driver 100 (in particular, the external force detector 160) will be described along with applied technologies, modified technologies, and the like. Unless otherwise stated or unless inconsistent, any features described above in connection with the embodiment applies to the practical examples described below. For any features of the practical examples that contradict what has been described above, their description given in connection with the practical examples may prevail. Unless inconsistent, any features of any of the plurality of practical examples can be applied to any other practical example (i.e., any two or more of the plurality of practical examples can be implemented in any combination).

First Practical Example

Figure 10:
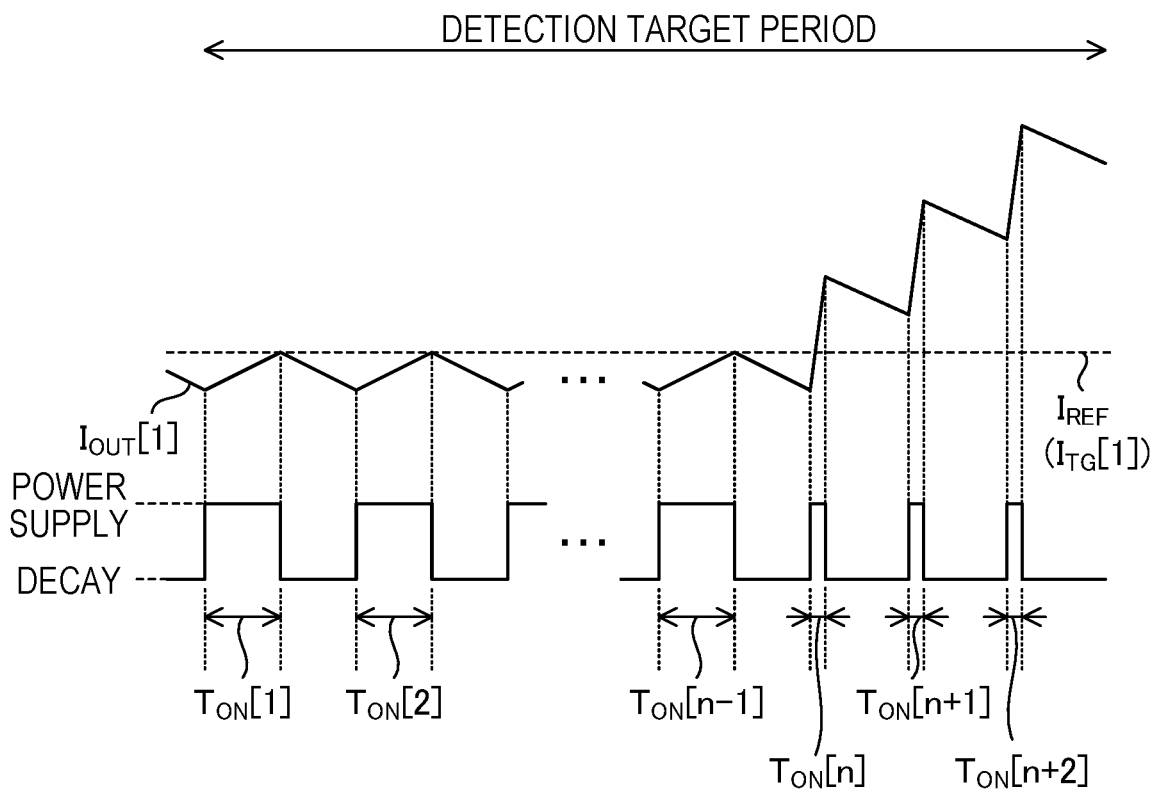
FIG. 10 is a schematic diagram illustrating a first method of detecting a particular current waveform for coping with a current bump in connection with a first practical example belonging to the embodiment of the present disclosure.

A first practical example will be described. In the first practical example, the external force detector 160 detects application of an external force (occurrence of a particular current waveform) by a first detection method. FIG. 10 is a schematic diagram illustrating the first detection method.

To give a specific description, assuming that holding control is being performed with $I_{TG}[1]=I_{REF}$ and $I_{TG}[2]=I_{CONST}$ and with focus on the first channel, the first detection method will be described. The external force detector 160 can set as a detection target period any period within a period in which holding control is performed (the same applies to any of the other practical examples described below). In the detection target period, through PWM constant current control during holding control, the unit operation described above is performed repeatedly so as to achieve $I_{OUT}[1]=I_{REF}$ and $I_{OUT}[2]=I_{CONST}$.

In the detection target period, for each unit operation, the external force detector 160 detects the time for which the output stage circuit 130 [1] is in the power supply state as an output on time. Of a plurality of unit operations belonging to the detection target period, the output on time in the j-th unit operation is represented by the symbol "$T_{ON}[j]$". Here, j is any integer.

For example, the external force detector 160 may detect the output on time $T_{ON}[j]$ based on the gate voltages of the output transistors M1[1] to M4[1]. In this case, for each unit operation, the external force detector 160 detects, as the output on time, the length of time during which the gate voltage of the output transistor M1[1] is at low level and in addition the gate voltage of the output transistor M4[1] is at high level. With each of the output transistors M1[1] and M2[1] configured as P-channel MOSFETs, it is on when its gate voltage is at low level and is off when its gate voltage is at high level. With each of the output transistors M3[1] and M4[1] configured as N-channel MOSFETs, it is on when its gate voltage is at high level and is off when its gate voltage is at low level.

For another example, the external force detector 160 may detect the output on time $T_{ON}[j]$ based on the motor driving signal fed from the control logic 122[1] to the pre-driver 131[1] to specify the on/off states of the output transistors M[1] to M4[1]. For yet another example, the external force detector 160 may detect the output on time $T_{ON}[j]$ based on the voltage at the output terminal $A_{OUT}[1]$.

In the detection target period, the external force detector 160 sets a reference on time $T_{ONREF}$ based on one or more output on times that have been detected. When, for example, the output on time $T_{ON}[j]$ is obtained as the latest output on time, the output on time $T_{ON}[j]$ itself is set as the reference on time $T_{ONREF}$, or, the simple moving average or the weighted moving average of a total of q output on times $T_{ON}[j-q+1]$, $T_{ON}[j-q+2]$ ... $T_{ON}[j-1]$, and $T_{ON}[j]$ is set as the reference on time $T_{ONREF}$. Here, q is an integer of two or more.

Figure 11:
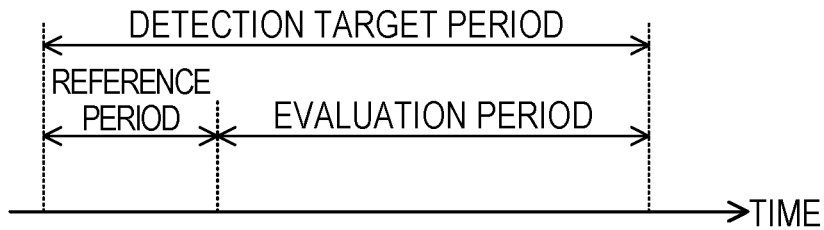
FIG. 11 is a diagram showing a relationship among a detection target period, a reference period, and an evaluation period in connection with the first practical example belonging to the embodiment of the present disclosure.

As shown in FIG. 11, the detection target period includes a reference period (a first period) and an evaluation period (a second period) occurring after the reference period. Based on one or more output on times in the reference period belonging to the detection target period, the external force detector 160 sets the reference on time $T_{ONREF}$. Thereafter, during the evaluation period, whether an external force is being applied is checked. Within a period in which holding control is performed, the external force detector 160 can set any period as the reference period, and can set any period after the reference period as the evaluation period. It is here assumed that no external force is being applied during the reference period.

With the first detection method, in the detection target period, the external force detector 160 detects application of an external force (occurrence of a particular current waveform) based on the state of power supply from the output stage circuit 130[1] to the motor coil L[1]. Used in this process as an index of the power supply state is the time for which power is supplied from the output stage circuit 130[1] to the motor coil L[1] with the output stage circuit 130[1] in the power supply state, that is, the output on time. That is, with the first detection method, in the detection target period, the external force detector 160 checks whether an external force is being applied based on a change in the output on time. More specifically, with the first detection method, the external force detector 160 detects application of an external force during the evaluation period by comparing the output on times detected sequentially during the evaluation period with the reference on time $T_{ONREF}$.

For example, the method proceeds as follows. Let one output on time during the evaluation period be called the evaluation on time. The external force detector 160 recognizes application of an external force during the evaluation period if a precondition $CND1_A$ requiring that the evaluation on time be shorter than the reference on time $T_{ONREF}$ is met and in addition either of the following conditions $CND_{1B}$ and $CND_{1C}$ is met: a condition $CND_{1B}$ requiring that the absolute value of the difference between the reference on time $T_{ONREF}$ and the evaluation on time be equal to or larger than a predetermined difference threshold value $DIF_{TH1}$; and a condition $CND_{1C}$ requiring that the ratio of the evaluation on time to the reference on time $T_{ONREF}$ be equal to or smaller than a predetermined ratio threshold value $RATIO_{TH1}$.

Accordingly, when the evaluation on time equals the output on time $T_{ON}[n]$ (where n is any integer),
if $T_{ONREF} > T_{ON}[n]$, the precondition $CND_{1A}$ is met,
if $|T_{ONREF} - T_{ON}[n]| \geq DIF_{TH1}$, the condition $CND_{1B}$ is met, and
if $T_{ON}[n]/T_{ONREF} \leq RATIO_{TH1}$, the condition $CND_{1C}$ is met.

The difference threshold value $DIF_{TH1}$ has a predetermined positive value expressed in time. The ratio threshold value $RATIO_{TH1}$ is a dimensionless quantity and has a predetermined positive value (e.g., 0.5) smaller than one.

A configuration is also possible where the external force detector 160 takes a plurality of consecutive output on times during the evaluation period as a plurality of evaluation on times and recognizes application of an external force during the evaluation period only if each of the plurality of evaluation on times meets the precondition $CND_{1A}$ as well as the condition $CND_{1B}$ or $CND_{1C}$.

If the rotor 210 rotates due to application of an external force during the evaluation period, the output on time during the evaluation period is expected to become shorter than the output on time during the reference period. Thus, it is possible to accurately detect application of an external force by checking whether the conditions described above are met.

While the first detection method has been described with focus on holding control with $I_{TG}[1]=I_{REF}$ for the first channel, the first detection method can be applied likewise to holding control under any other conditions (e.g., holding control with $I_{TG}[1]=-I_{REF}$), and can be applied likewise also to the second channel.

Second Practical Example

Figure 12:
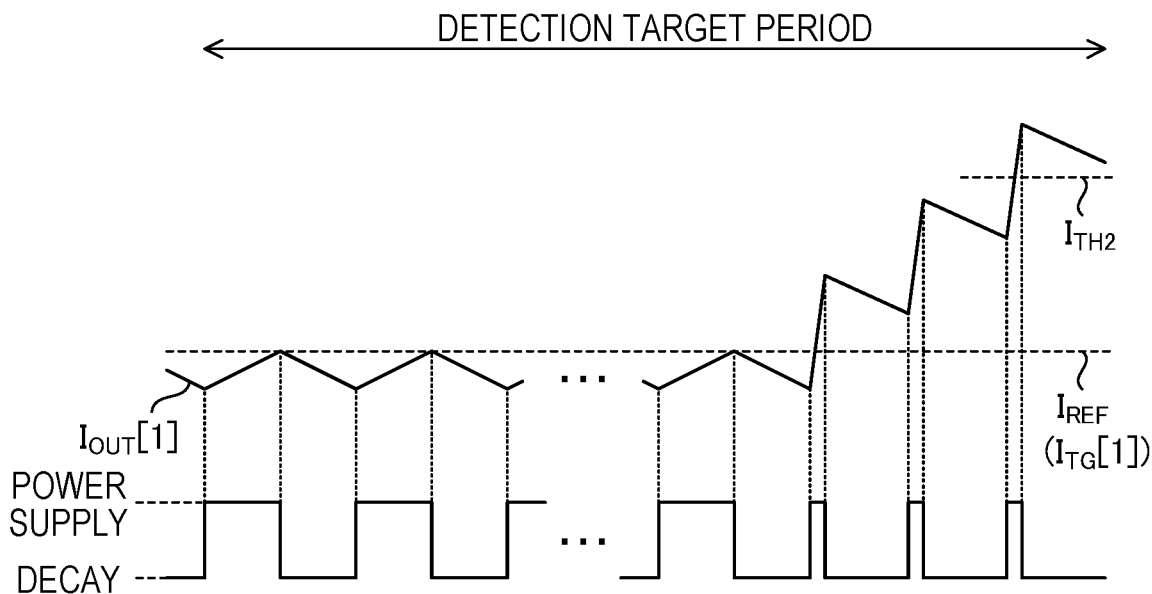
FIG. 12 is a schematic diagram illustrating a second method of detecting a particular current waveform for coping with a current bump in connection with a second practical example belonging to the embodiment of the present disclosure.

A second practical example will be described. An external force detector 160 according to the second practical example detects application of an external force (occurrence of a particular current waveform) by a second detection method. Also in the second practical example, to give a specific description, it is assumed that holding control is being performed with $I_{TG}[1]=I_{REF}$ and $I_{TG}[2]=I_{CONST}$. Attention will be paid to the detection target period (see FIG. 10) mentioned in connection with the first practical example. FIG. 12 is a schematic diagram illustrating the second detection method.

An external force detector 160 according to the second detection method sets a current threshold value $I_{TH2}$ greater than the target magnitude of the output current $I_{OUT}[1]$ during the detection target period in which holding control is performed, and recognizes application of an external force (occurrence of a particular current waveform) based on a comparison between the current threshold value $I_{TH2}$ and the magnitude of the output current $I_{OUT}[1]$.

As mentioned above, the target magnitude of the output current $I_{OUT}[1]$ is the target of the magnitude of the output current $I_{OUT}[1]$, and is the magnitude (absolute value $|I_{TG}[1]|$) of the target current value $I_{TG}[1]$. Here, it is assumed that $I_{TG}[1]>0$, and thus a current threshold value $I_{TH2}$ greater than the target current value $I_{TG}[i]$ can be set. Considering that the target current value $I_{TG}[1]$ can be negative, the current threshold value $I_{TH2}$ can be set according to Expression (2A) or (2B) below. Here, $\Delta_2$ has a predetermined positive value, and $k_2$ has a predetermined value (e.g., 1.1) greater than one.

$$I_{TH2}=|I_{TG}[1]|+\Delta_2 \tag{2A}$$

$$\text{oy } I_{TH2}=|I_{TG}[1]| \times k_2 \tag{2B}$$

With the second detection method, during the detection target period, the external force detector 160 recognizes application of an external force on detecting an output current $I_{OUT}[1]$ with a magnitude equal to or greater than the current threshold value $I_{TH2}$. The external force detector 160 can detect the output current $I_{OUT}[1]$ at any sampling timing during the detection target period. For example, in each unit operation during the detection target period, the output current $I_{OUT}[1]$ immediately before the end of the power supply mode operation can be sampled and detected and, if the magnitude of the output current $I_{OUT}[1]$ detected is equal to or greater than the current threshold value $I_{TH2}$, application of an external force can be recognized. It is instead also possible to sample the output current $I_{OUT}[1]$ in each of a plurality of consecutive unit operations and recognize application of an external force only if the plurality of magnitudes of the output current $I_{OUT}[1]$ sampled in the plurality of unit operations are all equal to or greater than the current threshold value $I_{TH2}$.

The external force detector 160 receives a signal indicating the result of detection of the output current $I_{OUT}[1]$. The signal indicating the result of detection of the output current $I_{OUT}[1]$ can be the detection voltage $V_{RNF}[1]$ obtained using the resistor R[1], or any other signal obtained using a current sensor other than the resistor R[1]. A current sensor other than the resistor R[1] is arranged at a point where the output current $I_{OUT}[1]$ passes or a current proportional to it passes, and based on the result of detection by that current sensor, the output current $I_{OUT}[1]$ is detected (as by its magnitude being detected).

While the second detection method has been described with focus on holding control with $I_{TG}[1]=I_{REF}$ for the first channel, the second detection method can be applied likewise to holding control under any other conditions (e.g., holding control with $I_{TG}[1]=-I_{REF}$), and can be applied likewise also to the second channel.

Third Practical Example

Figure 13:
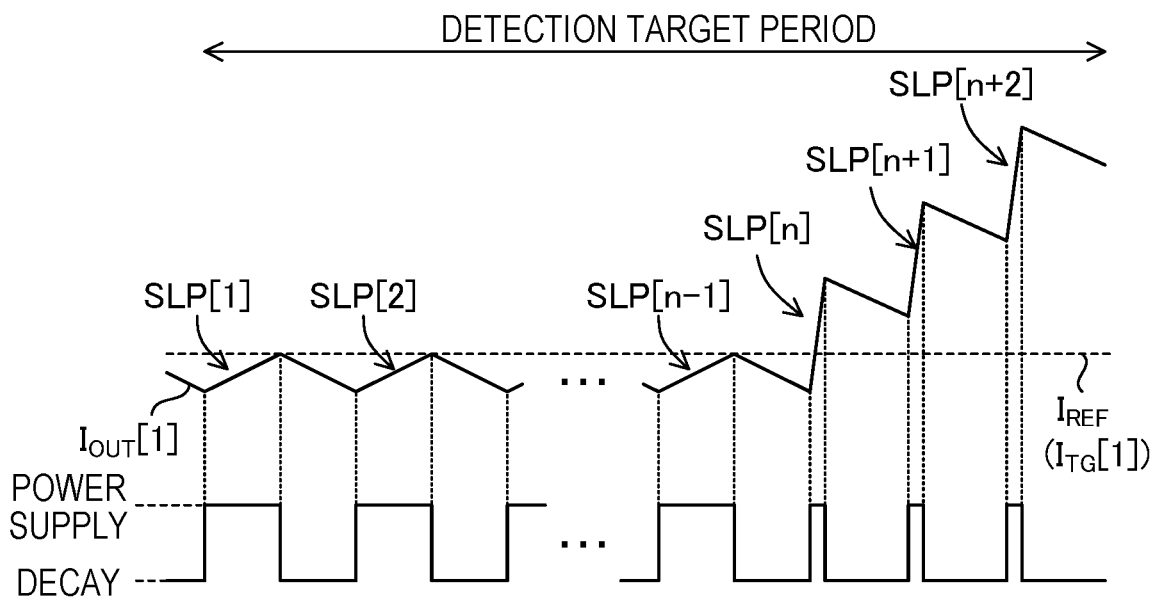
FIG. 13 is a schematic diagram illustrating a third method of detecting a particular current waveform for coping with a current bump in connection with a third practical example belonging to the embodiment of the present disclosure.

A third practical example will be described. An external force detector 160 according to the third practical example detects application of an external force (occurrence of a particular current waveform) by a third detection method. Also in the third practical example, to give a specific description, it is assumed that holding control is being performed with $I_{TG}[1]=I_{REF}$ and $I_{TG}[2]=I_{CONST}$. Attention will be paid to the detection target period (see FIG. 10) mentioned in connection with the first practical example. FIG. 13 is a schematic diagram illustrating the third detection method.

With the third detection method, during the detection target period in which holding control is performed, the external force detector 160 detects application of an external force (occurrence of a particular current waveform) based on the slope of increase of the magnitude of the output current $I_{OUT}[1]$ with the output stage circuit 130[1] in the power supply state. When $I_{OUT}[1]>0$, increase of the magnitude of the output current $I_{OUT}[1]$ is equivalent to increase of the output current $I_{OUT}[1]$. In the following description, the slope of increase of the magnitude of the output current $I_{OUT}[1]$ is referred to as the current slope SLP.

In the detection target period, for each unit operation, the external force detector 160 detects the current slope SLP of the output current $I_{OUT}[1]$ with the output stage circuit 130[1] in the power supply state. Of the plurality of unit operations that belong to the detection target period, the current slope SLP of the output current $I_{OUT}[1]$ in the j-th unit operation is identified specifically by the symbol "SLP[j]", where j is any integer.

For the detection of the current slope SLP, the external force detector 160 receives a signal indicating the result of detecting the output current $I_{OUT}[1]$. The signal indicating the result of detecting the output current $I_{OUT}[1]$ may be, as mentioned in connection with the second practical example, the detection voltage $V_{RNF}[1]$ obtained using the resistor R[1], or any other signal obtained using a current sensor other than the resistor R[1]. With respect to the j-th unit operation, the current slope SLP[j] is determined by dividing, by the duration of the power supply mode operation, the absolute value of the difference between the detected value of the output current $I_{OUT}[1]$ at the start timing of the power supply mode operation and the detected value of the output current $I_{OUT}[1]$ at the end timing of the power supply mode operation.

With the third detection method, during the detection target period, the external force detector 160 recognizes application of an external force on detecting a current slope SLP[j] equal to or greater than a predetermined slope threshold value $SLP_{TH3}$. That is, with respect to the j-th unit operation during the detection target period, if the acquired current slope SLP[j] is equal to or greater than the slope threshold value $SLP_{TH3}$, the external force detector 160 can recognize application of an external force. It is instead also possible to recognize application of an external force only if a plurality of consecutively detected current slopes (e.g., SLP[n], SLP[n+1], and SLP[n+2]) are all equal to or greater than the slope threshold value $SLP_{TH3}$.

If, during the detection target period, the rotor 210 rotates due to application of an external force, the current slope SLP mentioned above is expected to increase; thus, with the method described above, it is possible to detect application of an external force.

With the third detection method, it is also possible to set a reference period and an evaluation period as shown in FIG. 11, and detect application of an external force (occurrence of a particular current waveform) through a comparison of the current slope SLP during the reference period and the current slope SLP during the evaluation period. This will now be described as a modified version of the third detection method. The reference period and the evaluation period have the same significance as mentioned in connection with the first practical example.

The external force detector 160 sets a reference slope $SLP_{REF}$ based on one or more current slopes SLP detected during the reference period. For example, suppose that a current slope SLP[j] is obtained as the most recent current slope SLP, then the current slope SLP[j] is as it is taken as the reference slope $SLP_{REF}$. For another example, the simple moving average or the weighted moving average of a total of q current slopes SLP[j−q+1], SLP[j−q+2] . . . SLP[j−1], and SLP[j] can be taken as the reference slope $SLP_{REF}$. Here, q is any integer of two or more.

With the modified version of the third detection method, the external force detector 160 detects application of an external force (occurrence of a particular current waveform) based on change of the current slope SLP during the detection target period. More specifically, with the modified version of the third detection method, the external force detector 160 detects application of an external force (occurrence of a particular current waveform) during the evaluation period by comparing current slopes SLP detected consecutively during the evaluation period with the reference slope $SLP_{REF}$.

For example, the method proceeds as follows. Let one current slope SLP during the evaluation period be called the evaluation slope. The external force detector 160 recognizes application of an external force during the evaluation period if a precondition $CND_{3A}$ requiring that the evaluation slope be greater than the reference slope $SLP_{REF}$ is met and in addition either of the following conditions $CND_{3B}$ and $CND_{3C}$ is met: a condition $CND_{3B}$ requiring that the absolute value of the difference between the reference slope $SLP_{REF}$ and the evaluation slope be equal to or greater than a predetermined difference threshold value $DIF_{TH3}$; and a condition $CND_{3C}$ requiring that the ratio of the evaluation slope to the reference slope $SLP_{REF}$ be equal to or greater than a predetermined ratio threshold value $RATIO_{TH3}$.

Accordingly, in a case where the evaluation slope is the current slope SLP[n] (where n is any integer), if $SLP_{REF} < SLP[n]$, the precondition $CND_{3A}$ is met, if $|SLP[n] - SLP_{REF}| \geq DIF_{TH3}$, the condition $CND_{3B}$ is met, and if $SLP[n]/SLP_{REF} \geq RATIO_{TH3}$, the condition $CND_{3C}$ is met.

The difference threshold value $DIF_{TH3}$ has a predetermined positive value. The ratio threshold value $RATIO_{TH3}$ has a predetermined positive value (e.g., two) greater than one.

The external force detector 160 may take a plurality of consecutive current slopes SLP during the evaluation period as a plurality of evaluation slopes and recognize application of an external force during the evaluation period only if each of the plurality of evaluation slopes meets the precondition $CND_{3A}$ as well as either of the conditions $CND_{3B}$ and $CND_{3C}$.

While the third detection method has been described with focus on holding control with $I_{TG}[1] = I_{REF}$ for the first channel, the third detection method can be applied likewise to holding control under any other conditions (e.g., holding control with $I_{TG}[1] = -I_{REF}$), and can be applied likewise also to the second channel.

Fourth Practical Example

Figure 14:
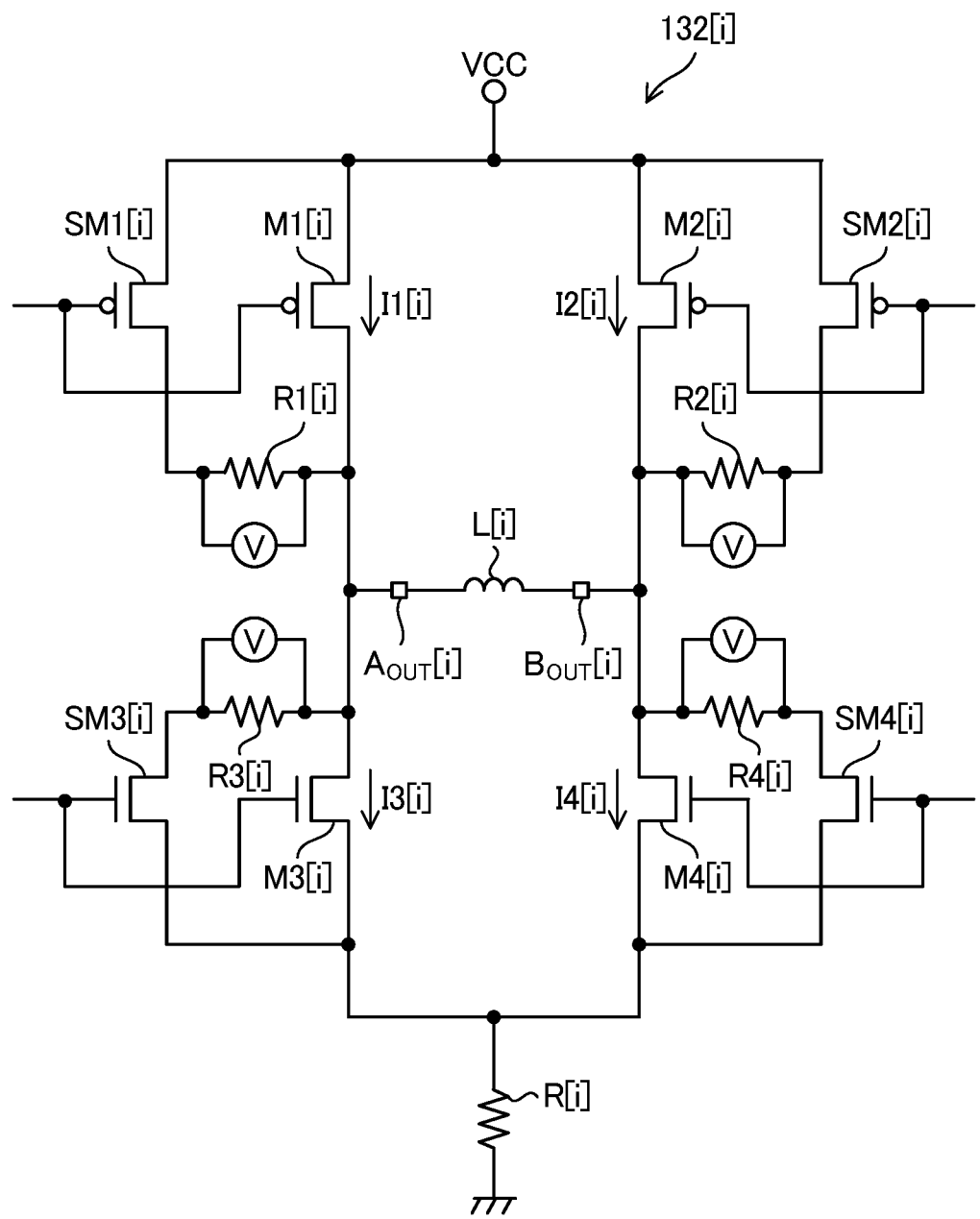
FIG. 14 is a configuration diagram for detection of currents through output transistors in connection with a fourth practical example belonging to the embodiment of the present disclosure.

A fourth practical example will be described. Here, the motor driver 100 includes transistor current sensors that sense individually the currents through a plurality of output transistors that constitute the half-bridge circuits 132[1] and 132[2]. FIG. 14 shows the transistor current sensors provided for the half-bridge circuit 132[i] in the i-th channel along with the half-bridge circuit 132[i]. In FIG. 14, the parasitic diodes in the transistors are omitted from illustration.

The transistor current sensor for the half-bridge circuit 132[i] includes a sense transistor SM1[i] and a sense resistor R1[i] corresponding to the output transistor M1[i], a sense transistor SM2[i] and a sense resistor R2[i] corresponding to the output transistor M2[i], a sense transistor SM3[i] and a sense resistor R3[i] corresponding to the output transistor M3[i], and a sense transistor SM4[i] and a sense resistor R4[i] corresponding to the output transistor M4[i]. The sense transistors SM1[i] and SM2[i] are configured as P-channel MOSFETs to suit the output transistors M1[i] and M2[i], and the sense transistors SM3[i] and SM4[i] are configured as N-channel MOSFETs to suit the output transistors M3[i] and M4[i].

Between the transistors SM1[i] and M1[i], the sources are connected together and the gates are connected together. Likewise, between the transistors SM2[i] and M2[i], the sources are connected together and the gates are connected together. Likewise, between the transistors SM3[i] and M3[i], the sources are connected together and the gates are connected together. Likewise, between the transistors SM4[i] and M4[i], the sources are connected together and the gates are connected together.

The drain of the sense transistor SM1[i] is connected via the sense resistor R1[i] to the drain of the output transistor M1[i]. The drain of the sense transistor SM2[i] is connected via the sense resistor R2[i] to the drain of the output transistor M2[i]. The drain of the sense transistor SM3[i] is connected via the sense resistor R3[i] to the drain of the output transistor M3[i]. The drain of the sense transistor SM4[i] is connected via the sense resistor R4[i] to the drain of the output transistor M4[i].

The source area ratio between an output transistor and a sense transistor is set such that the ratio between the drain current through a given output transistor and the drain current through the sense transistor corresponding to that output transistor has a predetermined value (e.g., 100:1). Accordingly, the transistor current sensors can sense the currents through the output transistors M1[i], M2[i], M3[i], and M4[i] by detecting the voltage drops across the sense resistors R1[i], R2[i], R3[i], and R4[i]. The currents through the output transistors M1[i], M2[i], M3[i], and M4[i] are represented by I1[i], I2[i], I3[i], and I4[i] respectively.

The transistor current sensor for the first channel is one example of a current sensor other than the resistor R[1] mentioned in connection with the second and third practical examples. A similar description applies to the second channel.

The output current $I_{OUT}[i]$ passes through two of the output transistors M1[i] to M4[i], and thus the external force detector 160 can recognize the output current $I_{OUT}[i]$ based on the respective gate voltages of the output transistors M1[i] to M4[i] (i.e., the on/off states of the output transistors M1[i] to M4[i]) and the currents I1[i] to I4[i]. Moreover, based on the results of detection of the currents through the output transistors M1[i] to M4[i] (i.e., the voltage drops across the sense resistors R1[i] to R4[i]), the external force detector 160 can acquire the current waveforms in the output transistors M1[i] to M4[i] in accordance with the output current $I_{OUT}[i]$. The current waveforms in the output transistors M1[i] to M4[i] correspond to the waveforms of the currents I1[i] to I4[i].

On the other hand, though no specific waveforms are illustrated, the current waveforms in the output transistors M1[i] to M4[i] exhibit a distinctive current waveform when an external force is being applied as is not observed when no external force is being applied. Accordingly, with a fourth detection method according to the fourth practical example, it is possible to detect application of an external force (occurrence of a particular current waveform) in the following manner.

For example, such a current waveform in the output transistors M1[i] to M4[i] as is expected to be observed if the rotor 210 rotates on application of an external force during holding control with $I_{TG}[1] = I_{REF}$ is acquired through experiments or the like at the stage of the designing of the motor driver 100. The current waveform thus acquired is taken as a reference current waveform (predetermined current waveform), and waveform information representing the reference current waveform is stored in a non-volatile memory (not shown) within the external force detector 160. Afterwards, when the motor driver 100 built in the motor driving system SYS goes into actual operation, during the detection target period (see FIG. 10) mentioned above, the external force detector 160 compares the current waveforms in the output transistors M1[1] to M4[1] (the results of detecting the currents I1[1] to I4[1]) with the reference current waveform based on the waveform information in the non-volatile memory; based on the similarity between those waveforms, the external force detector 160 can then detect application of an external force (occurrence of a particular current waveform). Similarity between waveforms can be evaluated by any known method. If the degree of similarity of the current waveforms in the output transistors M1[1] to M4[1] as acquired during the detection target period to the reference current waveform is equal to higher than a predetermined threshold value, the external force detector 160 can recognize application of an external force.

While the fourth detection method has been described with focus on holding control with $I_{TG}[1]=I_{REF}$ for the first channel, the fourth detection method can be applied likewise to holding control under any other conditions (e.g., holding control with $I_{TG}[1]=-I_{REF}$), and can be applied likewise also to the second channel.

The motor driver 100 includes an overcurrent protection circuit (not shown). On sensing a flow of the output current $I_{OUT}[i]$ with a magnitude equal to or greater than a predetermined overcurrent protection threshold value, the overcurrent protection circuit recognizes the i-th channel to be in an overcurrent state. On recognizing the i-th channel to be in an overcurrent state, the overcurrent protection circuit turns off all the output transistors (M1[i] to M4[i]) in the i-th channel and latches (holds) them in the off state, or it turns off all the output transistors (M1[1] to M4[1] and M1[2] to M4[2]) in the first and second channels and latches (holds) them in the off state. Based on the results of detection of the currents I1[i] to I4[i] by the transistor current sensors mentioned above, the overcurrent protection circuit can sense the magnitude of the output current $I_{OUT}[i]$ to be compared with the overcurrent protection threshold value. That is, by referring to, as the magnitude of the output current $I_{OUT}[i]$, one of the magnitudes of the currents I1[i] to I4[i] detected based on the voltage drops across the sense resistors R1[i] to R4[i], the overcurrent protection circuit can compare the magnitude of the output current $I_{OUT}[i]$ thus referred to with the overcurrent protection threshold value. This overcurrent protection threshold value is greater than the current threshold value $I_{TH2}$ (see FIG. 12) mentioned in connection with the second practical example. That is, the external force detector 160 detects application of an external force by sensing so small a bump in the output current $I_{OUT}[i]$ as not to be targeted by overcurrent protection.

Fifth Practical Example

A fifth embodiment will be described.
The motor driving system SYS and the motor driver 100 according to the embodiment find applications in sheet feeders in copiers and printers, image readers in scanners, and in any devices that employ stepping motors.

For any signal or voltage, the relationship between its high and low levels may be reversed so long as that can be done without departure from what has been described above.

According to the present disclosure, a driver device includes an output stage circuit that applies a voltage to a coil to thereby supply the coil with an output current and a control circuit that controls the output stage circuit. The driver device makes a movable part move with the magnetism generated by the supply of the output current. The control circuit is configured to perform holding control to hold the state of the movable part unchanged by suspending movement of the movable part through the control of the output stage circuit. While examples have been discussed above where the present disclosure is applied to a stepping motor that has, as a coil and a movable part, a motor coil and a rotor, the configurations described above can be applied to any devices other than stepping motors. For example, the present disclosure can be applied to solenoid actuators. Some solenoid actuators have a coil and a movable magnetic pole. In a solenoid actuator, applying a voltage to the coil causes a current (output current) to be supplied to the coil, and produces a magnetic field, which sets the movable magnetic pole in motion (linear or rotational motion). In a case where a driver device according to the present disclosure is applied to a solenoid actuator, the coil and the movable part of the driver device according to the present disclosure correspond to the coil and the movable magnetic pole of the solenoid actuator.

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the present disclosure and its constituent elements is not limited to what is specifically mentioned in connection with the embodiments. The specific values mentioned in the above description are merely illustrative and needless to say can be modified to different values.

Notes

To follow are notes in connection with the present disclosure of which specific examples of implementation have been described by way of practical examples above.

According to one aspect of the present disclosure, a driver device that moves a movable part (e.g., makes a rotor rotates) with the magnetism generated by supplying an output current ($I_{OUT}[i]$) to a coil (L[i]) includes: an output stage circuit (130[i]) configured to supply the output current to the coil by applying a voltage to the coil; and a control circuit (120[i]) configured to control the output stage circuit. The control circuit is configured to be able to perform holding control to hold the state of the movable part unchanged (i.e., hold the angle of the rotor unchanged) by suspending movement of the movable part through control of the output stage circuit. The driver device further includes: an external force detector (160) configured to, during the holding control by the control circuit, detect application of an external force tending to change the state of the movable part against the holding control, based on the state of power supply to the coil by the output stage circuit (see the first practical example; FIG. 10), the output current (see the second and third practical examples; FIGS. 12 and 13), or the current flowing through the output stage circuit (see the fourth practical example; FIG. 14). (A first configuration.)

In the driver device of the first configuration described above (see FIGS. 5 to 7), the control circuit may be configured to control the output stage circuit based on a current setting signal ($CNT_P[i]$, $V_{REF}[i]$) that sets the target of the output current to be supplied to the coil and a current sense signal ($V_{RNF}[i]$) that indicates the result of detecting the output current. The control circuit may be configured to perform, in the holding control, a unit operation, which comprises a sequence of a power supply mode operation and a decay mode operation, repeatedly to approximate the magnitude of the output current to a target magnitude ($I_{TG}[i]$) set by the current setting signal. The output stage circuit may be configured to be brought into, in the power supply mode operation, a power supply state in which the output stage circuit supplies power to the coil so as to increase the magnitude of the output current and be brought into, in the decay mode operation, a decay state in which the output stage suspends supplying power to the coil so as to reduce the magnitude of the output current. (A second configuration.)

In the driver device of the second configuration described above, the control circuit may be configured to, in each unit operation, perform the power supply mode operation at least for a predetermined forced power supply time, end the power supply mode operation if the magnitude of the output current is detected to be equal to or greater than the target magnitude when, after the start of the power supply mode operation, the forced power supply time has elapsed, and perform the decay mode operation for a predetermined decay time. (A third configuration.)

In the driver device of the second or third configuration described above (the first practical example; see FIG. 10), the external force detector may be configured to detect as an output on time ($T_{ON}[j]$) the time during which, in each unit operation, the output stage circuit is in the power supply state and detect application of the external force based on change of the output on time during a detection target period in which the holding control is performed in the control circuit. (A fourth configuration.)

In the driver device of the fourth configuration described above, the detection target period may include a first period and a second period occurring after the first period. The external force detector may be configured to set a reference on time based on one or more output on times detected as the output on time during the first period and detect application of the external force during the second period based on a comparison between the reference on time and the output on time during the second period. (A fifth configuration.)

In the driver device of the fifth configuration described above, the external force detector may be configured to, in a case where an evaluation on time, which is the output on time during the second period, is shorter than the reference on time, if the absolute value of the difference between the reference on time and the evaluation on time is equal to or greater than a predetermined difference threshold value or if the ratio of the evaluation on time to the reference on time is equal to or less than a predetermined ratio threshold value, recognizes application of the external force during the second period. (A sixth configuration.)

In the driver device of the second or third configuration described above (the second practical example; see FIG. 12), the external force detector may be configured to, during a detection target period in which the holding control is performed in the control circuit, detect application of the external force using a current threshold value ($I_{TH2}$) greater than the target magnitude ($I_{REF}$) based on a comparison between the current threshold value and the magnitude of the output current. (A seventh configuration.)

In the driver device of the seventh configuration described above, the external force detector may be configured to recognize application of the external force if, during the detection target period, the output current with a magnitude greater than the current threshold value is detected. (An eighth configuration.)

In the driver device of the second or third configuration described above (the third practical example; see FIG. 13), the external force detector may be configured to detect application of the external force based on the slope ($SLP[j]$) of increase of the magnitude of the output current with the output stage circuit in the power supply state during a detection target period in which the holding control is performed in the control circuit. (A ninth configuration.)

In the driver device of the ninth configuration described above, the external force detector may be configured to, during the detection target period, detect the slope of increase of the magnitude of the output current with the output stage circuit in the power supply state in each unit operation and, if the slope is detected to be equal to or greater than a predetermined slope threshold value, recognize application of the external force. (A tenth configuration.)

In the driver device of the ninth configuration described above, the detection target period may include a first period and a second period occurring after the first period. The external force detector may be configured to set a reference slope based on one or more slopes detected as the slope during the first period and then, based on a comparison between the reference slope and the slope during the second period, detect application of the external force during the second period. (An eleventh configuration.)

In the driver device of the eleventh configuration described above, the external force detector may be configured to, in a case where an evaluation slope, which is the slope during the second period, is greater than the reference slope, if the absolute value of the difference between the reference slope and the evaluation slope is equal to or greater than a predetermined difference threshold value or if the ratio of the evaluation slope to the reference slope is equal to or greater than a predetermined ratio threshold value, recognize application of the external force during the second period. (A twelfth configuration.)

In the driver device of any of the first to third configurations described above (the fourth practical example; see FIG. 14), the output stage circuit may include a full-bridge circuit comprising four output transistors. Currents commensurate with the output current may flow through the output transistors respectively. The external force detector may be configured to acquire the current waveforms in the output transistors respectively based on the results (corresponding to the voltage drops across $R1[i]$ to $R[i]$) of detection of the currents flowing through the output transistors respectively and detect application of the external force based on a comparison between the current waveforms in the output transistors and a predetermined current waveform during a detection target period in which the holding control is performed in the control circuit (reference current waveform). (A thirteenth configuration.)

In the driver device of any of the first to thirteenth configurations described above, the external force detector may be configured to, if the external force is detected to be applied, transmit a predetermined detection signal to a device external to the driver device. (A fourteenth configuration.)

In the driver device of any of the first to fourteenth configurations described above, the driver device may be a driver device for a stepping motor. The coil may be provided in the stepping motor. The movable part may be the rotor of the stepping motor, and the movement of the movable part may be the rotation of the rotor. In the holding control, the angle of the rotor may be held unchanged. The external force may be an external force tending to rotate the rotor against the holding control. (A fifteenth configuration.)

In the driver device of the fifteenth configuration described above, as the coil, a plurality of coils may be provided in the stepping motor. In the driver device, a plurality of channel circuits may be allocated to the plurality of coils respectively, and a plurality of the output stage circuits and a plurality of the control circuits may be provided for the channel circuits respectively. The rotor may rotate as a result of the output current being controlled in each of the channel circuits (A sixteenth configuration).

The invention claimed is:
1. A driver device that moves a movable part with magnetism generated by supplying an output current to a coil, the driver device comprising:
   an output stage circuit configured to supply the output current to the coil by applying a voltage to the coil; and a control circuit configured to control the output stage circuit, wherein the control circuit is configured to be able to perform holding control to hold a state of the movable part unchanged by suspending movement of the movable part through control of the output stage circuit, the driver device further comprises:

an external force detector configured to, during the holding control by the control circuit, detect application of an external force tending to change a state of the movable part against the holding control, based on a state of power supply to the coil by the output stage circuit, the output current, or a current flowing through the output stage circuit.

2. The driver device according to claim 1, wherein the control circuit is configured to control the output stage circuit based on a current setting signal that sets a target of the output current to be supplied to the coil and a current sense signal that indicates a result of detecting the output current, the control circuit is configured to perform, in the holding control, a unit operation, which comprises a sequence of a power supply mode operation and a decay mode operation, repeatedly to approximate a magnitude of the output current to a target magnitude set by the current setting signal, and the output stage circuit is configured to be brought into, in the power supply mode operation, a power supply state in which the output stage circuit supplies power to the coil so as to increase the magnitude of the output current and, be brought into, in the decay mode operation, a decay state in which the output stage suspends supplying power to the coil so as to reduce the magnitude of the output current.

3. The driver device according to claim 2, wherein the control circuit is configured to, in each unit operation, perform the power supply mode operation at least for a predetermined forced power supply time, end the power supply mode operation if the magnitude of the output current is detected to be equal to or greater than the target magnitude when, after a start of the power supply mode operation, the forced power supply time has elapsed, and perform the decay mode operation for a predetermined decay time.

4. The driver device according to claim 2, wherein the external force detector is configured to detect as an output on time a time during which, in each unit operation, the output stage circuit is in the power supply state and detect application of the external force based on change of the output on time during a detection target period in which the holding control is performed in the control circuit.

5. The driver device according to claim 4, wherein the detection target period includes a first period and a second period occurring after the first period, and the external force detector is configured to set a reference on time based on one or more output on times detected as the output on time during the first period and detect application of the external force during the second period based on a comparison between the reference on time and the output on time during the second period.

6. The driver device according to claim 5, wherein the external force detector is configured to, in a case where an evaluation on time, which is the output on time during the second period, is shorter than the reference on time, if an absolute value of a difference between the reference on time and the evaluation on time is equal to or greater than a predetermined difference threshold value or if a ratio of the evaluation on time to the reference on time is equal to or less than a predetermined ratio threshold value, recognize application of the external force during the second period.

7. The driver device according to claim 2, wherein the external force detector is configured to, during a detection target period in which the holding control is performed in the control circuit, detect application of the external force using a current threshold value greater than the target magnitude based on a comparison between the current threshold value and the magnitude of the output current.

8. The driver device according to claim 7, wherein the external force detector is configured to recognize application of the external force if, during the detection target period, the output current with a magnitude greater than the current threshold value is detected.

9. The driver device according to claim 2, wherein the external force detector is configured to detect application of the external force based on a slope of increase of the magnitude of the output current with the output stage circuit in the power supply state during a detection target period in which the holding control is performed in the control circuit.

10. The driver device according to claim 9, wherein the external force detector is configured to, during the detection target period, detect a slope of increase of the magnitude of the output current with the output stage circuit in the power supply state in each unit operation and, if the slope is detected to be equal to or greater than a predetermined slope threshold value, recognize application of the external force.

11. The driver device according to claim 9, wherein the detection target period includes a first period and a second period occurring after the first period, and the external force detector is configured to set a reference slope based on one or more slopes detected as the slope during the first period and then, based on a comparison between the reference slope and the slope during the second period, detect application of the external force during the second period.

12. The driver device according to claim 11, wherein the external force detector is configured to, in a case where an evaluation slope, which is the slope during the second period, is greater than the reference slope, if an absolute value of a difference between the reference slope and the evaluation slope is equal to or greater than a predetermined difference threshold value or if a ratio of the evaluation slope to the reference slope is equal to or greater than a predetermined ratio threshold value, recognize application of the external force during the second period.

13. The driver device according to claim 1, wherein the output stage circuit includes a full-bridge circuit comprising four output transistors, currents commensurate with the output current flow through the output transistors respectively, the external force detector is configured to
acquire current waveforms in the output transistors respectively based on results of detection of the currents flowing through the output transistors respectively and detect application of the external force based on a comparison between the current waveforms in the output transistors and a predetermined current waveform during a detection target period in which the holding control is performed in the control circuit.

14. The driver device according to claim 1, wherein the external force detector is configured to, if the external force is detected to be applied, transmit a predetermined detection signal to a device external to the driver device.

15. The driver device according to claim 1, wherein the driver device is a driver device for a stepping motor, the coil is provided in the stepping motor, the movable part is a rotor of the stepping motor and the movement of the movable part is rotation of the rotor, in the holding control, an angle of the rotor is held unchanged, and the external force is an external force tending to rotate the rotor against the holding control.

16. The driver device according to claim 15, wherein as the coil, a plurality of coils are provided in the stepping motor, in the driver device, a plurality of channel circuits are allocated to the plurality of coils respectively, and a plurality of the output stage circuits and a plurality of the control circuits are provided for the channel circuits respectively, and as a result of the output current being controlled in the channel circuits, the rotor rotates.

* * * * *